US012801211B2

(12) United States Patent
Ishikawa et al.

(10) Patent No.: US 12,801,211 B2
(45) Date of Patent: Nov. 17, 2026

(54) INFORMATION PROCESSING METHOD, INFORMATION PROCESSING DEVICE, AND NON-TRANSITORY COMPUTER READABLE STORAGE MEDIUM

(71) Applicant: Panasonic Intellectual Property Corporation of America, Torrance, CA (US)

(72) Inventors: Masafumi Ishikawa, Tokyo (JP); Kenta Murakami, Osaka (JP); Yuki Morimitsu, Kanagawa (JP); Koki Tanaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/985,653

(22) Filed: Dec. 18, 2024

(65) Prior Publication Data

US 2025/0123680 A1 Apr. 17, 2025

Related U.S. Application Data

(63) Continuation of application No. PCT/JP2022/044681, filed on Dec. 5, 2022.

(30) Foreign Application Priority Data

Jun. 23, 2022 (JP) ................................ 2022-101015

(51) Int. Cl.
*G06F 3/01* (2006.01)
*G06F 16/9035* (2019.01)

(52) U.S. Cl.
CPC .......... *G06F 3/011* (2013.01); *G06F 16/9035* (2019.01)

(58) Field of Classification Search
CPC ...................................................... G06Q 50/10
See application file for complete search history.

(56) References Cited

U.S. PATENT DOCUMENTS 11,388,371 B1 * 7/2022 Paepcke ................. H04N 7/157
2006/0045060 A1 * 3/2006 Miyazaki ............. G05D 1/0274
370/338

(Continued)

FOREIGN PATENT DOCUMENTS

JP 2017-157159 9/2017
JP 6294825 3/2018
WO 2019/087537 5/2019

OTHER PUBLICATIONS

International Search Report (ISR) from International Searching Authority (Japan Patent Office) in International Pat. Appl. No. PCT/JP2022/044681, dated Feb. 14, 2023, together with an English language translation.

*Primary Examiner* — Andre L Matthews
(74) *Attorney, Agent, or Firm* — Greenblum & Bernstein, P.L.C.

(57) ABSTRACT

A computer acquires information indicative of a device operation and a behavior of a target user and presence or absence of an other user in an environment where the target user is present; extracts, on the basis of these information, first action information indicative of a device operation and/or a behavior of the target user in a first environment where the other user is absent and second action information indicative of a device operation and/or a behavior of the target user in a second environment where the other user is present, estimates a first characteristic of the target user who is in the first environment on the basis of the first action information, and a second characteristic of the target user who is in the second environment on the basis of the second (Continued)

action information, and outputs information indicative of the first characteristic and/or the second characteristic.

23 Claims, 16 Drawing Sheets

(56) References Cited

U.S. PATENT DOCUMENTS

| | | | | |
|---|---|---|---|---|
| 2011/0205366 | A1* | 8/2011 | Enohara | F24F 11/30<br>348/143 |
| 2015/0039428 | A1* | 2/2015 | Yoneda | A47L 9/2805<br>705/14.53 |
| 2018/0308127 | A1 | 10/2018 | Yoneda et al. | |
| 2020/0333033 | A1 | 10/2020 | Kitagawa et al. | |
| 2022/0239867 | A1* | 7/2022 | Shintani | G06F 3/011 |

* cited by examiner

FIG.4

| OPERATION DATE AND TIME | USER ID | DEVICE ID | OPERATION ITEM |
|---|---|---|---|
| AUGUST 31, 2021 07:05:30 | USER A | LIGHT 1 | TURNING ON |
| AUGUST 31, 2021 07:06:00 | USER A | LIGHT 1 | SETTING DAYLIGHT COLOR |
| AUGUST 31, 2021 07:10:00 | USER A | AIR CONDITIONER 1 | TURNING ON<br>SETTING AIR CONDITIONER TO 26°C |
| AUGUST 31, 2021 07:15:45 | USER B | REFRIGERATOR 1 | OPENING DOOR |
| AUGUST 31, 2021 07:16:10 | USER B | REFRIGERATOR 1 | CLOSING DOOR |
| AUGUST 31, 2021 07:20:10 | USER B | COFFEE MAKER 1 | TURNING ON |
| AUGUST 31, 2021 07:23:10 | USER B | TOASTER 1 | TURNING ON |
| ... | ... | ... | ... |

FIG.6

| FIRST CHARACTERISTIC INFORMATION | |
|---|---|
| CONSTITUENT TRAIT | INTENSITY |
| NEGLIGENT | 0.3 |
| SPENDTHRIFT | 0.2 |
| TIDY | 0.3 |
| NERVOUS | 0.1 |
| SENSITIVE TO HEAT | 0.1 |

FIG.7

| SECOND CHARACTERISTIC INFORMATION | |
|---|---|
| CONSTITUENT TRAIT | INTENSITY |
| NEGLIGENT | 0.1 |
| THRIFTY | 0.1 |
| TIDY | 0.5 |
| NERVOUS | 0.1 |
| COMMUNICATIVE | 0.2 |

FIG.8

| CANDIDATE TRAIT | FEATURE GROUP OF OPERATIONS OF DEVICE OR EQUIPMENT | |
|---|---|---|
| | FEATURE 1 | FEATURE 2 |
| NEGLIGENT | LESS OPERATING THE LIGHT | LONG REFRIGERATOR DOOR OPENING DURATION |
| METICULOUS | MORE OPERATING THE LIGHT | SHORT REFRIGERATOR DOOR OPENING DURATION |
| SPENDTHRIFT | LONG AIR CONDITIONER OPERATING DURATION | HEAVY SUBSCRIPTION SERVICE USAGE |
| THRIFTY | FREQUENTLY CHANGING AIR CONDITIONER SET TEMPERATURE | LIGHT SUBSCRIPTION SERVICE USAGE |
| WELL-REGULATED | LIGHT TURNED ON AT THE SAME TIME EVERY MORNING | COFFEE MAKER ACTIVATED AT THE SAME TIME |
| IRREGULAR | LIGHT TURNED ON AT IRREGULAR TIMES IN THE MORNING | COFFEE MAKER ACTIVATED AT IRREGULAR TIMES |
| TIDY | AIR CONDITIONER FILTER CLEANED EVERY YEAR | LONG VACUUM CLEANER OPERATION DURATION |
| UNTIDY | AIR CONDITIONER FILTER NEVER CLEANED | SHORT VACUUM CLEANER OPERATION DURATION |

FIG.9

| CANDIDATE TRAIT | FEATURE GROUP OF BEHAVIORS | |
|---|---|---|
| | FEATURE 1 | FEATURE 2 |
| NEGLIGENT | MESSY DESK | LESS FOLDING THE LAUNDRY |
| METICULOUS | ORGANIZED DESK | MORE FOLDING THE LAUNDRY |
| WELL-REGULATED | ENTRANCE DOOR OPENED AT THE SAME TIME EVERY MORNING | REGULAR BEDTIME |
| IRREGULAR | ENTRANCE DOOR OPENED AT IRREGULAR TIMES IN THE MORNING | IRREGULAR BEDTIME |
| SPENDTHRIFT | LARGE AMOUNT OF WASTE | KEEPING HOUSEHOLD ACCOUNTS |
| THRIFTY | SMALL AMOUNT OF WASTE | NOT KEEPING HOUSEHOLD ACCOUNTS |
| LONER | LONG TIME SPENT IN ONE'S ROOM | SHORT TIME SPENT OUT OF HOME |
| COMMUNICATIVE | MANY CONVERSATIONS IN LIVING ROOM | LONG TIME SPENT OUT OF HOME |

FIG.10

| CONSTITUENT TRAIT | INTENSITY | EXECUTION NUMBERS OF DISTINCTIVE ACTIONS |
|---|---|---|
| NEGLIGENT | 0.10 | 10 TIMES |
| THRIFTY | 0.10 | 10 TIMES |
| TIDY | 0.50 | 50 TIMES |
| NERVOUS | 0.10 | 10 TIMES |
| COMMUNICATIVE | 0.20 | 20 TIMES |

FIG.11

| CONSTITUENT TRAIT | INTENSITY | EXECUTION NUMBERS OF DISTINCTIVE ACTIONS |
|---|---|---|
| NEGLIGENT | 0.109 | 11 TIMES |
| THRIFTY | 0.099 | 10 TIMES |
| TIDY | 0.495 | 50 TIMES |
| NERVOUS | 0.099 | 10 TIMES |
| COMMUNICATIVE | 0.198 | 20 TIMES |

FIG.14

| CONSTITUENT TRAIT 1 | CONSTITUENT TRAIT 2 | PROVIDING SERVICE |
|---|---|---|
| THRIFTY | WELL-REGULATED | PREDICTION OF EXPENDABLE PART EXPENDITURE PERIOD |
| THRIFTY | TIDY | SUGGESTION OF LIFE TIPS |
| NEGLIGENT | SPENDTHRIFT | AUTOMATIC ORDER OF EXPENDABLE PART |
| ... | ... | ... |

FIG.15

| TYPE | PROVIDING SERVICE | COEFFICIENT | SERVICE FIELD |
|---|---|---|---|
| NOTIFICATION | NOTIFICATION OF TO-DO LIST | 0.1 | LIFE (GENERAL) |
| | NOTIFICATION OF PAST PICTURES | 0.1 | LIFE (GENERAL) |
| | NOTIFICATION OF SCHEDULE OF CURRENT DAY | 0.1 | LIFE (GENERAL) |
| | ALERT NOTIFICATION OF DEVICE OR EQUIPMENT | 0.1 | DEVICE OR EQUIPMENT |
| | NOTIFICATION OF MAINTENANCE PERIOD OF DEVICE OR EQUIPMENT | 0.1 | DEVICE OR EQUIPMENT |
| | NOTIFICATION OF SCHEDULED DELIVERY DATE AND TIME | 0.1 | LIFE (GENERAL) |
| | NOTIFICATION OF EXPENDITURE STATE OF EXPENDABLE PART | 0.1 | DEVICE OR EQUIPMENT |
| | NOTIFICATION OF CURRENT HEALTH CONDITION | 0.1 | LIFE (HEALTHCARE) |
| PREDICTION | PREDICTION OF HEALTH CONDITION BASED ON CURRENT HEALTH CONDITION | 0.1 | LIFE (HEALTHCARE) |
| | PREDICTION OF EXPENDABLE PART EXPENDITURE PERIOD | 0.1 | DEVICE OR EQUIPMENT |
| SUGGESTION | SUGGESTION OF LIFE TIPS | 0.1 | LIFE (HOUSEWORK) |
| CONTROL | AUTOMATIC CONTROL OF DEVICE OR EQUIPMENT | 0.1 | DEVICE OR EQUIPMENT |
| | AUTOMATIC ORDER OF EXPENDABLE PART | 0.1 | LIFE (EC) |

FIG.16

| TYPE | PROVIDING SERVICE | COEFFICIENT | SERVICE FIELD |
|---|---|---|---|
| OUTSOURCING | FOOD DELIVERY (MEAL, FOOD) | 0.1 | LIFE (DIET) |
| | HOUSEKEEPING SERVICE (E.G., HOUSE CLEANING, MEAL PREPARATION, BABYSITTING) | 0.1 | LIFE (HOUSEWORK) |
| | TABLE RESERVATION (MEANS OF TRANSPORT, RESTAURANT) | 0.1 | LIFE (DIET) |
| | TRAVEL RESERVATION (E.G., MEANS OF TRANSPORT, ACCOMMODATION FACILITIES, ACCOMMODATION PLAN) | 0.1 | LIFE (LEISURE) |
| | TICKET RESERVATION (E.G., MOVIE, EVENT, AMUSEMENT FACILITIES, AMUSEMENT PARK) | 0.1 | LIFE (LEISURE) |

INFORMATION PROCESSING METHOD, INFORMATION PROCESSING DEVICE, AND NON-TRANSITORY COMPUTER READABLE STORAGE MEDIUM

FIELD OF INVENTION

The present disclosure relates to a technique of estimating a characteristic of a user.

BACKGROUND ART

A technique of estimating an intention and a taste of a user on the basis of a search history or a browsing history of the user in a cyberspace such as a website has been conventionally known. Further, Patent Literature 1 discloses estimating a characteristic tendency of a user in a behavior involving the processing of a material on the basis of a use history of a device for processing the material.

However, no consideration can be seen in the conventional art about estimating a characteristic of a user separately according to the presence or the absence of an other user in an environment where the user is present.

Patent Literature 1: Japanese Patent No. 6294825

SUMMARY OF THE INVENTION

The present disclosure has been made in order to solve the above problem, and the object thereof is to provide an information processing method, an information processing device and a non-transitory computer readable storage medium which make it possible to separately estimate a characteristic of a user according to the presence or the absence of an other user in an environment where the user is present.

An information processing method according to an aspect of the present disclosure is an information processing method for estimating a characteristic of a user by a computer, and includes acquiring first information indicative of a device operation and a behavior of a target user to be estimated; acquiring second information indicative of presence or absence of an other user different from the target user in an environment where the target user is present; extracting, on the basis of the first information and the second information, first action information indicative of at least one of a device operation and a behavior of the target user in a first environment where the other user is absent and second action information indicative of at least one of a device operation and a behavior of the target user in a second environment where the other user is present; estimating a first characteristic that is a characteristic of the target user in the first environment on the basis of the first action information, and a second characteristic that is a characteristic of the target user in the second environment on the basis of the second action information; and outputting at least one of first characteristic information indicative of the first characteristic and second characteristic information indicative of the second characteristic.

BRIEF DESCRIPTION OF THE DRAWINGS

FIG. 4 is a table showing exemplary operation information.

FIG. 6 is a table showing exemplary first characteristic information.

FIG. 7 is a table showing exemplary second characteristic information.

FIG. 8 is a table showing exemplary first rule information defining a relationship between one or more candidate traits and one or more feature groups indicative of features of operation to a device or an equipment.

FIG. 9 is a table showing exemplary first rule information defining a relationship between one or more candidate traits and one or more feature groups indicative of features of behavior.

FIG. 10 is a table showing exemplary relationships between traits of a target user and execution numbers of distinctive actions showing respective constituent traits before an update.

FIG. 11 is a table showing exemplary relationships between traits of the target user and execution numbers of distinctive actions showing respective constituent traits after an update.

FIG. 14 is a table showing exemplary second rule information.

FIG. 15 is a table showing exemplary third rule information.

FIG. 16 is a table showing a remaining part of the exemplary third rule information.

DETAILED DESCRIPTION

Figure 1:
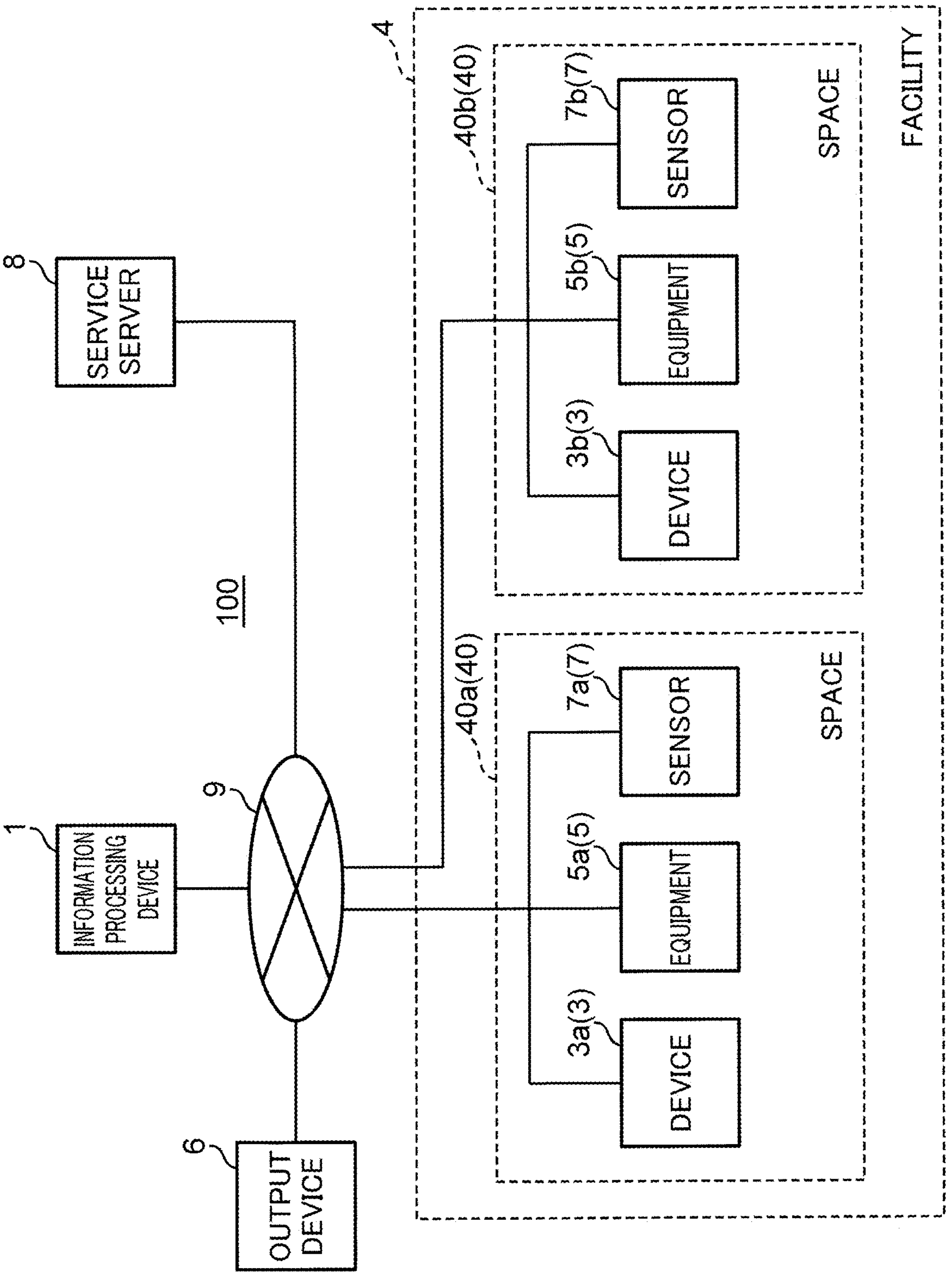
FIG. 1 is a diagram showing a general configuration of an information processing system according to an embodiment of the present disclosure.

Circumstances which LED to the Present Disclosure

There has been conventionally known a technique of estimating, on the basis of a search history or a browsing history of the user in a cyberspace such as a website, an intention and a taste of the user, and providing the user with a service suitable for the estimated intention and taste. However, in this conventional technique, the estimation of the intention and the taste of the user is performed on the basis of information reflecting the intention and the taste of the user, actively input by the user, such as an input of a search keyword, a click on a product image, or the like. Therefore, an environment in which the user is invited to actively input information is required to adopt this technique.

In this respect, Patent Literature 1 discloses a technique of estimating a characteristic tendency of a user on the basis of use history of a device of the user in a situation where the user does not actively input information. However, no consideration can be seen in Patent Literature 1 about separate estimation of a characteristic of a user according to the presence or the absence of an other user in an environment where the user is present.

Therefore, even if the technique of Patent Literature 1 is utilized, the technique cannot provide a user with a service suitable to the user in consideration of a difference between a characteristic of the user who is alone and a characteristic of the user who is with an other person.

Accordingly, the present inventors have intensively studied a technique of separately estimating a characteristic of a user according to the presence or the absence of an other user in an environment where the user is present. As a result, the present inventors have worked out embodiments of the present disclosure described below.

(1) An information processing method according to an aspect of the present disclosure is an information processing method for estimating a characteristic of a user, by a computer, and includes acquiring first information indicative of a device operation and a behavior of a target user to be estimated; acquiring second information indicative of presence or absence of an other user different from the target user in an environment where the target user is present; extracting, on the basis of the first information and the second information, first action information indicative of at least one of a device operation and a behavior of the target user in a first environment where the other user is absent and second action information indicative of at least one of a device operation and a behavior of the target user in a second environment where the other user is present; estimating a first characteristic that is a characteristic of the target user in the first environment on the basis of the first action information, and a second characteristic that is a characteristic of the target user in the second environment on the basis of the second action information; and outputting at least one of first characteristic information indicative of the first characteristic and second characteristic information indicative of the second characteristic.

In this configuration, the first characteristic that is a characteristic of the target user in the first environment where the other user is absent is estimated on the basis of the first action information. Further, the second characteristic that is a characteristic of the target user in the second environment where the other user is present is estimated on the basis of the second action information. Therefore, in this configuration, a characteristic of the target user can be separately estimated according to the presence or the absence of the other user in an environment where the target user is present.

(2) In the information processing method recited in the above (1), in the estimation of the first characteristic and the second characteristic, first rule information defining a relationship between one or more candidate traits and one or more feature groups indicative of features of a device operation or a behavior of the target user is acquired, and in a case that a device operation or a behavior showing one or more first feature groups included in the one or more feature groups is included in the first action information, it may be appreciated that one or more first candidate traits associated with the one or more first feature groups are specified among the one or more candidate traits, and the specified one or more first candidate traits are estimated to be the first characteristic, and in a case that a device operation or a behavior showing one or more second feature groups included in the one or more feature groups is included in the second action information, it may be appreciated that one or more second candidate traits associated with the one or more second feature groups are specified among the one or more candidate traits, and the specified one or more second candidate traits are estimated to be the second characteristic.

In this configuration, one or more first candidate traits associated with each of the one or more first feature groups shown by a device operation or a behavior included in the first action information are estimated as the first characteristic with reference to the first rule information. Additionally, one or more second candidate traits associated with each of the one or more second feature groups shown by a device operation or a behavior included in the second action information are estimated as the second characteristic with reference to the first rule information. Therefore, in this configuration, the characteristic of the target user during the presence and the absence of the other user in the environment where the target user is present can be separately estimated.

(3) In the information processing method recited in the above (2), the first characteristic includes one or more first constituent traits, and the second characteristic includes one or more second constituent traits, and it may be appreciated that, on the basis of the first action information, the number of executions of a first distinctive action that is a device operation or a behavior showing a feature group associated with each of the one or more first constituent traits is calculated, and the calculated number of executions of the first distinctive action is set as an intensity of each of the first constituent traits; and, on the basis of the second action information, the number of executions of a second distinctive action that is a device operation or a behavior showing a feature group associated with each of the one or more second constituent traits is calculated, and the calculated number of executions of the second distinctive action is set as an intensity of each of the second constituent traits, whereby the first characteristic information includes the intensity of each of the first constituent traits, and the second characteristic information includes the intensity of each of the second constituent traits.

In this configuration, the number of executions of the first distinctive action calculated on the basis of the first action information is set as an intensity of each of the first constituent traits included in the first characteristic and is included in the first characteristic information. Further, the number of executions of the second distinctive action calculated on the basis of the second action information is set as an intensity of each of the second constituent traits included in the second characteristic and is included in the second characteristic information.

Therefore, according to the first characteristic information in this configuration, it is possible to grasp not only one or more traits of the target user during the absence of the other user in the environment where the target user is present but also the intensity of each of the one or more traits. Additionally, according to the second characteristic information in this configuration, it is possible to grasp not only one or more traits of the target user during the presence of the other user in the environment where the target user is present but also the intensity of each of the one or more traits.

(4) In the information processing method recited in the above (3), it may be appreciated that in the setting of the intensity of each of the first constituent traits and each of the second constituent traits, third action information indicative of a device operation and a behavior of one or more other users different from the target user is further acquired, a first average that is an average of the numbers of executions of the first distinctive action by each of the one or more other users per a predetermined time is calculated on the basis of the third action information, a first execution number that is the number of executions of the first distinctive action per the predetermined time is calculated on the basis of the first action information, and a result obtained by dividing the first execution number by the first average is set as an intensity of each of the first constituent traits, and a second average that is an average of the numbers of executions of the second distinctive action by each of the one or more other users per the predetermined time is calculated on the basis of the third action information, a second execution number that is the number of executions of the second distinctive action per the predetermined time is calculated on the basis of the second action information, and a result obtained by dividing the second execution number by the second average is set as an intensity of each of the second constituent traits.

In this configuration, a result which is obtained by dividing the first execution number that is the number of executions of the first distinctive action by the target user per the predetermined time by the first average that is an average of the numbers of executions of the first distinctive action by each of the one or more other users different from the target user per the predetermined time is set as an intensity of each of the first constituent traits.

Therefore, this configuration makes it possible to properly set the intensity of each of the first constituent traits using the first average as a reference value. Similarly, this configuration makes it possible to properly set the intensity of each of the second constituent traits using the second average that is an average of the numbers of executions of the second distinctive action by each of the one or more other users per the predetermined time as a reference value.

(5) In the information processing method recited in the above (3), it may be appreciated that in the estimation of the first characteristic and the second characteristic, in a case that a common distinctive action that is a device operation or a behavior showing a feature group associated with a common candidate trait predetermined among the one or more candidate traits is included in at least one of the first action information and the second action information, the common candidate trait is estimated to be a common constituent trait included in the first characteristic and the second characteristic, in the setting of the intensity of each of the first constituent traits and each of the second constituent traits, a first execution number that is the number of executions of the common distinctive action is calculated on the basis of the first action information, a second execution number that is the number of executions of the common distinctive action is calculated on the basis of the second action information, and a sum of the first execution number and the second execution number is set as an intensity of the common constituent trait.

In this configuration, a common candidate trait can be estimated to be a common constituent trait that is included in the first characteristic and the second characteristic, in a case that a common distinctive action associated with the common candidate trait is included in at least one of the first action information and the second action information even if the common distinctive action is not included in the other of the first action information and the second action information.

Additionally, a sum of the respective execution numbers of the common distinctive action calculated on the basis of the first action information and the second action information can be set as the intensity of the common constituent trait instead of the execution number of the common distinctive action calculated on the basis of one of the first action information and the second action information.

(6) In the information processing method recited in the above (3), it may be appreciated that in the estimation of the first characteristic and the second characteristic, in a case that a common distinctive action that is a device operation or a behavior showing a feature group associated with a common candidate trait predetermined among the one or more candidate traits is included in at least one of the first action information and the second action information, the common candidate trait is estimated to be a common constituent trait included in the first characteristic and the second characteristic, in the setting of the intensity of each of the first constituent traits and each of the second constituent traits, a first time for which the target user is in the first environment is calculated on the basis of the first action information, and a second time for which the target user is in the second environment is calculated on the basis of the second action information, a first execution number that is the number of executions of the common distinctive action is calculated on the basis of the first action information, and a second execution number that is the number of executions of the common distinctive action is calculated on the basis of the second action information, a result obtained by dividing a product of the first time and a sum of the first execution number and the second execution number by a sum of the first time and the second time is set as an intensity of the common constituent trait included in the first characteristic, and a result obtained by dividing a product of the second time and the sum of the first execution number and the second execution number by the sum of the first time and the second time is set as an intensity of the common constituent trait included in the second characteristic.

In this configuration, a common candidate trait can be estimated to be a common constituent trait included in the first characteristic and the second characteristic in a case that a common distinctive action associated with the common candidate trait is included in at least one of the first action information and the second action information even if the common distinctive action is not included in the other of the first action information and the second action information.

Additionally, a sum of the execution numbers of the common distinctive action respectively calculated on the basis of the first action information and the second action information is allocated in proportion to the duration of the first time for which the target user has been in the first environment and the duration of the second time for which the target user has been in the second environment, and the respectively allocated portions can be properly set as respective intensities of the common constituent trait included in the first characteristic and the second characteristic.

(7) In the information processing method recited in the above (5), further, in a case that an identical constituent trait indicates close intensities in the first characteristic and the second characteristic, the identical constituent trait may be estimated to be the common constituent trait.

In this configuration, in the case that an identical constituent trait indicates close intensities in the first characteristic and the second characteristic, the identical constituent trait is estimated to be the common constituent trait. Therefore, a sum of the execution numbers of the device operation or the behavior showing a feature group associated with the identical constituent trait respectively calculated on the basis of the first action information and the second action information can be set as the intensity of the identical constituent trait.

(8) In the information processing method recited in the above (5), further, in a case that a like distinctive action that is a device operation or a behavior which shows one of the one or more feature groups and of which respective numbers of executions per a unit time in the first environment and the second environment are close to each other is included in the first information, a candidate trait associated with the one feature group shown by the like distinctive action may be estimated to be the common constituent trait.

In this configuration, in the case that a like distinctive action is included in the first information, a candidate trait associated with a feature group shown by the like distinctive action is estimated to be the common constituent trait. Therefore, a sum of the execution numbers of the like distinctive action respectively calculated on the basis of the first action information and the second action information may be set as the intensity of the common constituent trait.

(9) In the information processing method recited in any one of the above (3) to (8), in a case that no device operation or behavior showing one feature group associated with one of the one or more first constituent traits is executed for a first predetermined time or longer, the intensity of the one first constituent trait may be reduced by a first reduction rate, and in a case that no device operation or behavior showing one feature group associated with one of the one or more second constituent traits is executed for a second predetermined time or longer, the intensity of the one second constituent trait may be reduced by a second reduction rate.

This configuration makes it possible to reduce, by the first reduction rate, an intensity of a first constituent trait in connection with which no device operation or behavior showing the associated feature group has been executed for a first predetermined time or longer among the one or more first constituent traits included in the first characteristic. Similarly, this configuration makes it possible to reduce, by the second reduction rate, an intensity of a second constituent trait in connection with which no device operation or behavior showing the associated feature group has been executed for a second predetermined time or longer among the one or more second constituent traits included in the second characteristic.

(10) In the information processing method recited in any one of the above (3) to (9), it may be appreciated to further calculate a ratio of the intensity of each of the one or more first constituent traits to a sum of the intensities of the one or more first constituent traits to set the calculated ratio as an intensity of each of the first constituent traits; and calculate a ratio of the intensity of each of the one or more second constituent traits to a sum of the intensities of the one or more second constituent traits to set the calculated ratio as an intensity of each of the second constituent traits.

In this configuration, a ratio of the intensity of each of the one or more first constituent traits to a sum of the intensities of the one or more first constituent traits is set as an intensity of each of the first constituent traits included in the first characteristic. Therefore, the intensities of the one or more first constituent traits included in the first characteristic can be normalized. Similarly, in this configuration, a ratio of the intensity of each of the one or more second constituent traits to a sum of the intensities of the one or more second constituent traits is set as the intensity of each of the second constituent traits included in the second characteristic. Accordingly, the intensities of the one or more second constituent traits included in the second characteristic can be normalized.

(11) In the information processing method recited in the above (2), in a case that no device operation or behavior showing one feature group associated with one of the one or more first constituent traits is executed for a first predetermined time or longer, the one first constituent trait may be excluded from the first characteristic; and in a case that no device operation or behavior showing one feature group associated with one of the one or more second constituent traits is executed for a second predetermined time or longer, the one second constituent trait may be excluded from the second characteristic.

This configuration makes it possible to exclude, from the first characteristic, a first constituent trait in connection with which no device operation or behavior showing the associated feature group has been executed for the first predetermined time or longer among the one or more first constituent traits included in the first characteristic. Similarly, this configuration makes it possible to exclude, from the second characteristic, a second constituent trait in connection with which no device operation or behavior showing the associated feature group has been executed for the second predetermined time or longer among the one or more second constituent traits included in the second characteristic.

(12) In the information processing method recited in the above (1), it may be appreciated to further acquire information indicative of one or more attributes of the other user, and to extract, from the second action information, fourth action information indicative of a device operation and a behavior of the target user in a third environment in which the other user of each of the one or more attributes is present, and to estimate, on the basis of the fourth action information, a third characteristic that is a characteristic of the target user in the third environment, and to output third characteristic information concerning the third characteristic.

In this configuration, a third characteristic that is a characteristic of the target user in each of the third environments where an other user of the corresponding one of the one or more attributes is present is estimated. Therefore, in this configuration, the characteristic of the target user can be separately estimated according to attributes of an other user who is present in an environment where the user is present.

(13) In the information processing method recited in the above (1), it may be appreciated that in the acquisition of the first information, information indicative of a device operation and a behavior of the target user in a first predetermined period is acquired as the first information, and in the acquisition of the second information, information indicative of a history concerning presence or absence of the other user in an environment where the target user is present in the first predetermined period is acquired as the second information.

In this configuration, the information indicative of a device operation and a behavior of the target user in the first predetermined period is acquired as the first information, and the information indicative of a history concerning presence or absence of the other user in the environment where the target user is present in the first predetermined period is acquired as the second information. Therefore, the first characteristic and the second characteristic of the target user in the first predetermined period can be properly estimated on the basis of the first action information and the second action information extracted from the first information in view of the second information.

(14) In the information processing method recited in the above (1), it may be appreciated to further acquire third information indicative of a behavior of the target user in an environment where the target user is currently present; and it is determined, on the basis of the third information, which of the first environment or the second environment a fourth environment where the target user is currently present is; in a case that the fourth environment is the first environment, acquire the first characteristic information, determine a first service to be performed to the target user on the basis of the first characteristic information, and perform the first service; and in a case that the fourth environment is the second environment, acquire the second characteristic information, determine a second service to be performed to the target user on the basis of the second characteristic information, and perform the second service.

In this configuration, a determination is made as to which of the first environment or the second environment the fourth environment where the target user is currently present is. In the case that the fourth environment is the first environment, the first characteristic information is acquired, and in the case that the fourth environment is the second environment, the second characteristic information is acquired. Additionally, in the case that the fourth environment is the first environment, a first service determined on the basis of the first characteristic information is performed, and in the case that the fourth environment is the second environment, a second service determined on the basis of the second characteristic information is performed. Therefore, this configuration makes it possible to perform a service suitable to a characteristic of the target user in an environment where the target user is currently present.

(15) In the information processing method recited in the above (14), it may be appreciated that the first characteristic includes one or more first constituent traits, the second characteristic includes one or more second constituent traits, and in the determination of the first service and the second service, second rule information defining a relationship between one or more constituent trait groups each showing one or more constituent traits and one or more providing services is acquired, in a case that the first characteristic includes one or more first constituent trait groups included in the one or more constituent trait groups, one or more first providing services associated with the one or more first constituent trait groups are specified, and the specified one or more first providing services are determined as the first service, and in a case that the second characteristic includes one or more second constituent trait groups included in the one or more constituent trait groups, one or more second providing services associated with the one or more second constituent trait groups are specified, and the specified one or more second providing services are determined as the second service.

In this configuration, one or more first providing services associated with the one or more first constituent trait groups included in the first characteristic are determined as the first service to be performed in the case that a fourth environment is the first environment by referring to the second rule information. Further, one or more second providing services associated with the one or more second constituent trait groups included in the second characteristic are determined as the second service to be performed in the case that the fourth environment is the second environment by referring to the second rule information. Therefore, this configuration makes it possible to perform one or more services suitable to a characteristic of the target user in an environment where the target user is currently present.

(16) In the information processing method recited in the above (3), it may be appreciated to further acquire third information indicative of a behavior of the target user in an environment where the target user is currently present; determine, on the basis of the third information, which of the first environment or the second environment a fourth environment where the target user is currently present is; in a case that the fourth environment is the first environment, acquire the first characteristic information, determine a first service to be performed to the target user on the basis of the first characteristic information, and perform the first service; and in a case that the fourth environment is the second environment, acquire the second characteristic information, determine a second service to be performed to the target user on the basis of the second characteristic information, and perform the second service.

In this configuration, a determination is made as to which of the first environment or the second environment the fourth environment where the target user is currently present is. In the case that a fourth environment is the first environment, the first characteristic information is acquired, and in the case that the fourth environment is the second environment, the second characteristic information is acquired. Additionally, in the case that the fourth environment is the first environment, a first service determined on the basis of the first characteristic information is performed. In the case that the fourth environment is the second environment, a second service determined on the basis of the second characteristic information is performed. Therefore, this configuration makes it possible to perform a service suitable to a characteristic of the target user in an environment where the target user is currently present.

(17) In the information processing method recited in the above (16), it may be appreciated that, in the determination of the first service and the second service, second rule information defining a relationship between one or more constituent trait groups each showing one or more constituent traits and one or more providing services is acquired, in a case that the first characteristic includes one or more first constituent trait groups included in the one or more constituent trait groups, one or more first providing services associated with the one or more first constituent trait groups are specified, and in a case that the second characteristic includes one or more second constituent trait groups included in the one or more constituent trait groups, one or more second providing services associated with the one or more second constituent trait groups are specified, third rule information that associates the one or more providing services, coefficients given to the respective providing services, and service fields to which the respective providing services pertain with one another is acquired, a first product for each of the one or more first providing services is calculated by multiplying a sum of intensities of one or more constituent traits included in the first characteristic and included in constituent trait groups associated with the respective first providing services by a coefficient given to the respective first providing service, in a case that a sum of the first products calculated for at least one first providing services pertaining to each of one or more first service fields, to which the one or more first providing services belong, among the one or more service fields is equal to or greater than a first predetermined value, the at least one first providing services are determined as the first service, a second product for each of the one or more second providing services is calculated by multiplying a sum of intensities of one or more constituent traits included in the second characteristic and included in constituent trait groups associated with the respective second providing services by a coefficient given to the respective second providing service, in a case that a sum of the second products calculated for at least one second providing services pertaining to each of one or more second service fields, to which the one or more second providing services belong, among the one or more service fields is equal to or greater than the first predetermined value, the at least one second providing services are determined as the second service.

In this configuration, in the case that a sum of the first products which are calculated for the at least one first providing services pertaining to each of the one or more first service fields by referring to the second rule information and the third rule information is equal to or greater than the first predetermined value, the at least one first providing services are determined as the first service to be performed in the case that the fourth environment is the first environment.

Therefore, this configuration makes it possible to decide whether or not to determine at least one first providing services pertaining to each of the one or more first service fields as the first service in the case that the target user is in the first environment.

Similarly, this configuration makes it possible to decide whether or not to determine at least one second providing services pertaining to each of the one or more second service fields as the second service in the case that the target user is in the second environment.

(18) In the information processing method recited in any one of the above (14) to (17), it may be appreciated that, in a case that a plurality of users is present in the same environment, the second service is determined by treating each of the users as the target user, and in a case that a plurality of the determined second services includes a plurality of services of performing automatic control to the device provided in the environment where the users are present according to a characteristic of the users, parameters used for automatic control to the device are averaged in performance of the services.

In this configuration, in a case that a plurality of the second services determined in connection with an environment occupied by a plurality of users includes a plurality of services of performing automatic control of a device provided in the environment where the users are present according to a characteristic of the users, parameters used for automatic control of the device in performance of the services are averaged. Therefore, this configuration makes it possible to avoid a conflict between respective parameters used for automatic control of a device by a plurality of services in the performance of the services.

(19) In the information processing method recited in any one of the above (14) to (17), it may be appreciated that, in a case that a plurality of users is present in the same environment, the second service is determined by treating each of the users as the target user, and in a case that a plurality of the determined second services includes a plurality of services of performing automatic control to the device provided in the environment where the users are present according to a characteristic of the users, in performance of the services, a priority level predefined for each of the users is acquired, and the service that is among the services and is determined to be the second service to be offered to the user who has the highest priority level among the users is performed.

In this configuration, in a case that a plurality of second services determined in connection with an environment occupied by a plurality of users includes a plurality of services of performing automatic control of a device provided in the environment where the users are present according to a characteristic of the users, one of the services that is determined to be the second service to be performed to a user who has the highest priority level among the users is performed. Therefore, this configuration makes it possible to avoid a conflict between respective automatic controls of a device by a plurality of services in the performance of the services.

(20) In the information processing method recited in any one of the above (14) to (17), it may be appreciated that, in a case that a plurality of users is present in the same environment, the second service is determined by treating each of the users as the target user, and in a case that a plurality of the determined second services includes a plurality of services of performing automatic control to the device provided in the environment where the users are present according to a characteristic of the users, the one of the services with the highest number of overlaps among the services is performed in the performance of the services.

In this configuration, in a case that a plurality of second services determined in connection with an environment occupied by a plurality of users includes a plurality of services of performing automatic control of a device provided in the environment where the users are present according to a characteristic of the users, one of the services with the highest number of overlaps among the services is performed. Therefore, this configuration makes it possible to avoid a conflict between respective automatic controls of a device by a plurality of services in the performance of the services.

(21) In the information processing method recited in the above (15) or (17), it may be appreciated that, in a case that a plurality of users is present in the same environment, the second service is determined by treating each of the users as the target user, and in a case that a plurality of the determined second services includes a plurality of services of performing automatic control to the device provided in the environment where the users are present according to a characteristic of the users, a priority order predetermined for each of the one or more constituent trait groups is acquired, and in performance of the services, a service associated with the lowest constituent trait group in the priority order among the services is performed.

In this configuration, in a case that a plurality of second services determined in connection with an environment occupied by a plurality of users includes a plurality of services of performing automatic control of a device provided in the environment where the users are present according to a characteristic of the users, a service associated with the lowest constituent trait group in the priority order among the services is performed. Therefore, this configuration makes it possible to avoid a conflict between respective automatic controls of a device by a plurality of services in the performance of the services.

(22) An information processing device according to another aspect of the present disclosure is an information processing device for estimating a characteristic of a user, the information processing device including: a first acquisition part that acquires first information indicative of a device operation and a behavior of a target user to be estimated; a second acquisition part that acquires second information indicative of presence or absence of an other user different from the target user in an environment where the target user is present; an extraction part that extracts, on the basis of the first information and the second information, first action information indicative of at least one of a device operation and a behavior of the target user in a first environment where the other user is absent and second action information indicative of at least one of a device operation and a behavior of the target user in a second environment where the other user is present; an estimation part that estimates a first characteristic that is a characteristic of the target user in the first environment on the basis of the first action information, and a second characteristic that is a characteristic of the target user in the second environment on the basis of the second action information; and an output part that outputs at least one of first characteristic information indicative of the first characteristic and second characteristic information indicative of the second characteristic.

In this configuration, the same advantageous effects as the information processing method described above can be obtained.

(23) A non-transitory computer readable storage medium according to still another aspect of the present disclosure is a non-transitory computer readable storage medium storing a program causing a computer to function as estimating a characteristic of a user, the program causing the computer to function as: a first acquisition part that acquires first information indicative of a device operation and a behavior of a target user to be estimated; a second acquisition part that acquires second information indicative of presence or absence of an other user different from the target user in an environment where the target user is present; an extraction part that extracts, on the basis of the first information and the second information, first action information indicative of at least one of a device operation and a behavior of the target user in a first environment where the other user is absent and second action information indicative of at least one of a device operation and a behavior of the target user in a second environment where the other user is present; an estimation part that estimates a first characteristic that is a characteristic of the target user in the first environment on the basis of the first action information, and a second characteristic that is a characteristic of the target user in the second environment on the basis of the second action information; and an output part that outputs at least one of first characteristic information indicative of the first characteristic and second characteristic information indicative of the second characteristic.

In this configuration, the same advantageous effects as the information processing method described above can be obtained.

The present disclosure may be implemented also as a system which operates in accordance with the program. It is needless to say that the computer program may be distributed via a computer-readable non-transitory recording medium such as a CD-ROM or a communication network such as Internet.

In addition, each of the embodiments described below shows a specific example of the present disclosure. The numerical values, shapes, constituent elements, steps, order of steps, and the like shown in the following embodiments are merely examples, and are not intended to delimit the present disclosure. Also, among the constituent elements in the following embodiments, constituent elements not recited in the independent claims representing the broadest concepts are described as optional constituent elements. In all the embodiments, the respective contents may also be combined.

First Embodiment

Hereinafter, an embodiment of the present disclosure will be described with reference to the drawings. FIG. 1 is a diagram showing a general configuration of an information processing system 100 according to an embodiment of the present disclosure. The information processing system 100 includes a plurality of devices 3, equipment (apparatuses) 5, and sensors 7, an output device 6, and an information processing device 1 which are provided in a facility (environment) 4.

The devices 3, the equipment 5, the sensors 7, and the information processing device 1 are mutually communicably connected via a network 9. The network 9 is a public communication network such as Internet. The network 9 may be a local area network. The devices 3, the equipment 5, and the sensors 7 may be mutually communicably connected via a local network in the facility 4.

The facility 4 is divided into a plurality of spaces (environments) 40. Some of the spaces 40 are provided with a plurality of devices 3, equipment 5, and sensors 7. FIG. 1 shows an example in which the facility 4 is divided into a first space 40*a* and a second space 40*b*, the first space 40*a* is provided with a device 3*a*, an equipment 5*a*, and a sensor 7*a*, and the second space 40*b* is provided with a device 3*b*, an equipment 5*b*, and a sensor 7*b*.

The facility 4 is, for example, a dwelling. The dwelling may be an apartment or may be an independent house. In a case that the facility 4 is a dwelling, the space 40 is, for example, a living room, a dining room, a kitchen, an LDK (a living-dining-kitchen), a western style room, a Japanese style room, a corridor, a toilet, an entrance, a bath, or the like. The LDK is a space that is adapted for a living room, a dining room, and a kitchen. Further, the space 40 may include, for example, a first floor and a second floor. Alternatively, the entire dwelling may be a single space 40.

Alternatively, the facility 4 may be an office. In a case that the facility 4 is an office, the space 40 is, for example, an office room, a conference room, an office kitchenette, a drawing room, a lobby, a corridor, a toilet, or the like. Further, the space 40 may include, for example, a first floor and a second floor. Alternatively, the entire office may be a single space 40.

The device 3 is an electronic device freely arrangeable in the facility 4, such as a rice cooker, a washing machine, a refrigerator, a microwave oven, and a cleaning robot. The device 3 is operated via a switch incorporated in the device 3 or a remote controller. The equipment 5 is an electronic apparatus such as an electronic lock, an air conditioner, a photovoltaic power apparatus or the like that is installed at a predetermined position in the facility 4. The equipment 5 is operated via a switch incorporated in the equipment 5 or a remote controller.

The device 3 and the equipment 5 do not include an information processing device such as a personal computer, a smartphone, and a tablet terminal. The operation to the device 3 and the equipment 5 does not include an operation involving a user's active input of information reflecting an intention or taste thereof, e.g., an input of a search keyword, or a click on a product image.

When operated by a user, the device 3 and the equipment 5 send information concerning the operation (hereinafter, operation information) to the information processing device 1 via the network 9.

The operation information includes a date and time (hereinafter, operation date and time) when the device 3 and the equipment 5 were operated, identification information (hereinafter, user ID) of the user who operated the device 3 and the equipment 5, identification information (hereinafter, device ID) of the device 3 and the equipment 5, information (hereinafter, operation item information) indicative of details on the operations to the device 3 and the equipment 5. The operation information sent from the device 3 and the equipment 5 may not include a user ID of the user who operated the device 3 and the equipment 5.

The operation item information includes information indicative of a condition (hereinafter, condition information) of the device 3 and the equipment 5 when being operated, information (hereinafter, setting information) set by the operation to the device 3 and the equipment 5, and information (hereinafter, function information) indicative of a function executed by the operation to the device 3 and the equipment 5.

The sensor 7 periodically detects information concerning the space 40 provided with the sensor 7. The sensor 7 sends information (hereinafter, sensor information) including detected information (hereinafter, detection information), a date and time (hereinafter, detection date and time) when the detected information was detected, and identification information (hereinafter, sensor ID) of the sensor 7 to the information processing device 1 via the network 9. The sensor 7 includes a camera, a microphone, a radio wave sensor, and a human sensing sensor.

The camera captures an image of the space 40 and sends sensor information including image data indicative of the captured image as the detection information. The microphone collects sound generated in the space 40 and sends sensor information including audio data indicative of the collected sound as the detection information. The radio wave sensor detects a location and a shape of a person who is present in the space 40 on the basis of an intensity of radio waves and sends sensor information including information indicative of the detected location and shape of the person as the detection information. The human sensing sensor is, for example, an infrared sensor and a beacon sensor, and detects whether a person is present in the space 40. When detecting the presence of a person in the space 40, the human sensing sensor sends the sensor information including information indicative of the location of the person as the detection information.

The output device 6 is mutually communicably connected to the information processing device 1 via the network 9. The output device 6 outputs information specified by the information processing device 1 via the network 9. The output device 6 includes a display, a speaker, and a controller.

The display is, for example, a display unit provided on a television receiving set or a personal computer arranged in the facility 4. The display is not limited thereto and may be included in a mobile terminal which can be brought out of the facility 4, such as a smartphone and a tablet terminal, or may be included in the device 3 and the equipment 5. The display shows a still image or a moving image specified by the information processing device 1.

The speaker is, for example, a smart speaker arranged in the facility 4. The speaker is not limited thereto and may be included in a mobile terminal which can be brought out of the facility 4, such as a smartphone and a tablet terminal, or may be included in the device 3 and the equipment 5. The speaker outputs audio indicative of information specified by the information processing device 1.

The controller is, for example, a home controller or an edge server arranged in the facility 4. The controller is not limited thereto and may be a mobile terminal which can be brought out of the facility 4 such as a smartphone and a tablet terminal. The controller is further connected to the device 3, the equipment 5, and the sensor 7 via the network 9 or wirelessly communicably without using the network 9. The controller outputs information (hereinafter, control information) concerning a control of the device 3, the equipment 5, and the sensor 7 which is input by an operation of the user or is specified by the information processing device 1 to the device 3, the equipment 5, and the sensor 7. The device 3, the equipment 5, and the sensor 7 execute various functions in accordance with the control information. The controller thus remotely controls the device 3, the equipment 5, and the sensor 7.

The information processing device 1 includes a cloud server, a personal computer, and the like. The information processing device 1 may use an edge server provided in the facility 4. The information processing device 1 is mutually communicably connected to an external service server 8 via the network 9.

The service server 8 includes a cloud server and a personal computer. The service server 8 performs a service requested by the information processing device 1 via the network 9. The service to be performed by the service server 8 includes a service of forwarding information specified by the information processing device 1 to an unillustrated data base and/or external service server, a service of acquiring, from the unillustrated data base and/or external service server, the information specified by the information processing device 1 and returning it thereto.

Figure 2:
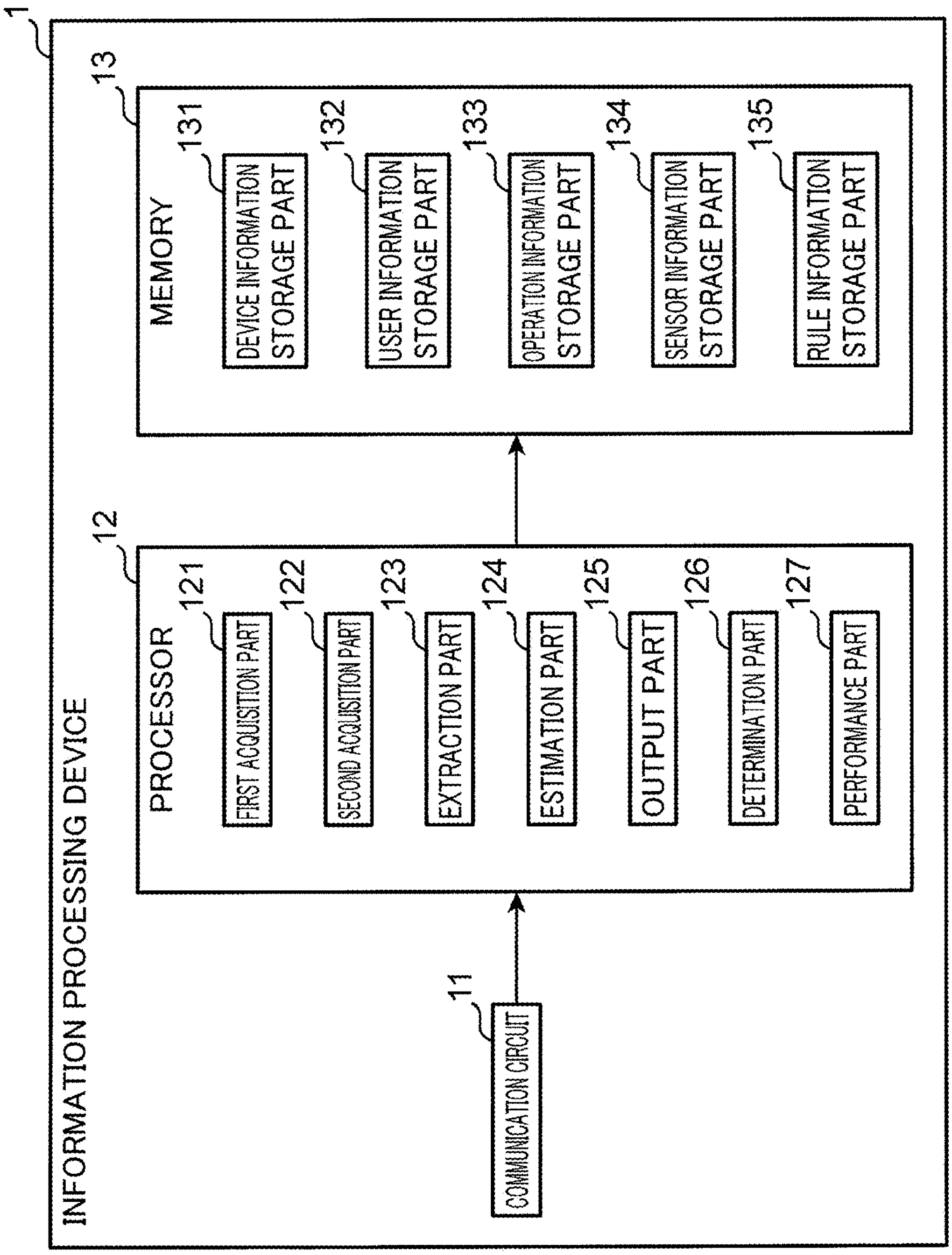
FIG. 2 is a block diagram showing a configuration of an exemplary information processing device.

Hereinafter, detailed description will be made about the information processing device 1. FIG. 2 is a block diagram showing a configuration of an exemplary information processing device 1. The information processing device 1 includes a communication circuit 11, a processor 12, and a memory 13.

The communication circuit 11 is a communication interface circuit adapted to a communication system by use of the network 9, e.g., Ethernet (trademark). The communication circuit 11 connects the information processing device 1 to the network 9. The communication circuit 11 outputs various information which is received via the network 9 to the processor 12. Further, under the control of the processor 12, the communication circuit 11 sends various information to an external device via the network 9.

The processor (computer) 12 has, for example, a CPU. The processor 12 stores in an operation information storage part 133 to be described later operation information which is received by the communication circuit 11 from a device 3 and an equipment 5 via the network 9. Further, the processor 12 stores in a sensor information storage part 134 to be described later sensor information which is received by the communication circuit 11 from the sensor 7 via the network 9.

Further, the processor 12 functions as a first acquisition part 121, a second acquisition part 122, an estimation part 124, an output part 125, a determination part 126, and a performance part 127. The first acquisition part 121 to the performance part 127 may be accomplished by an execution of a predetermined program stored in the memory 13 by the processor 12 or may be accomplished by a dedicated hardware circuit. In the first embodiment, the processor 12 functions as the first acquisition part 121, the second acquisition part 122, the estimation part 124, and the output part 125. Details on the first acquisition part 121 to the output part 125 will be described later.

The memory 13 is composed of a storage device, e.g., a hard disk drive and a solid-state drive. The memory 13 includes a device information storage part 131, a user information storage part 132, the operation information storage part 133, the sensor information storage part 134, and a rule information storage part 135. The device information storage part 131 to the rule information storage part 135 are not limited to the provision in the memory 13 but may be provided in an external storage device which the processor 12 can access using the communication circuit 11 via the network 9.

The device information storage part 131 stores information (hereinafter, device information) concerning the device 3, the equipment 5, and the sensor 7. Specifically, the device information concerning the device 3 and the equipment 5 includes identification information (hereinafter, space ID) of the space 40 provided with the device 3 and the equipment 5, the device ID of the device 3 and the equipment 5, an address indicating a destination for a control information transmission to the device 3 and the equipment 5, functions of the device 3 and the equipment 5, a use start period of expendable parts used by the device 3 and the equipment 5, and a condition (normal, anomalous) of the device 3 and the equipment 5. The device information concerning the sensor 7 includes a space ID of the space 40 provided with the sensor 7 and a sensor ID of the sensor 7.

The user information storage part 132 stores information (hereinafter, user information) concerning each of a plurality of users of the information processing system 100. Specifically, the user information includes a user ID of the user, information (hereinafter, attribute information) concerning an attribute of the user, and information (hereinafter, characteristic information) indicative of a characteristic of the user.

The attribute information includes, for example, an address, an age, a gender, a group being part of, and a role in the group of the user. The group includes, for example, a family and a department or a section of a company. The role includes, for example, father, mother, son, daughter, department director, section director, and the like.

The characteristic information includes a characteristic of the user and an intensity thereof. The characteristic of the user includes one or more constituent traits. Constituent traits include, for example, negligent, meticulous, spendthrift, thrifty, well-regulated, irregular, tidy, untidy, nervous, loner, communicative, and the like. Further, the characteristic information is categorized into information (hereinafter, first characteristic information) indicative of a characteristic of the user when an other user is absent in the space 40 where the user is present, i.e., the user is alone in the space 40 and information (hereinafter, second characteristic information) indicative of a characteristic of the user displayed when an other user is present in the space 40 where the user is present, which are stored separately.

The user information storage part 132 further stores reference data. The reference data is used to collate with detection information included in the sensor information for the purposes such as identifying the user who is in the space 40 provided with a sensor 7 and identifying the user who has operated the device 3 and the equipment 5 provided in the same space 40 provided with the sensor 7. Specifically, the reference data includes various data indicative of particulars of the user, e.g., image data indicative of a photographed image of a face or a full-length of the user, audio data indicative of a voice of the user, shape data indicative of a shape of the user, and a user ID of the user.

Further, the user information storage part 132 stores information peculiar to a user, e.g., a to-do list, a schedule, a vital data, an ongoing subscription service, and a preferred external service of the user, identification information of the output device 6 used by the user, and an IP address of the output device 6.

The operation information storage part 133 stores operation information received by the communication circuit 11 from the device 3 and the equipment 5 via the network 9.

The sensor information storage part 134 stores sensor information received by the communication circuit 11 from the sensor 7 via the network 9.

The rule information storage part 135 stores information (hereinafter, rule information) indicative of various rules used by the processor 12 for various processing. Details on the rule information stored in the rule information storage part 135 will be described later.

Flow of Characteristic Output Process

Figure 3:
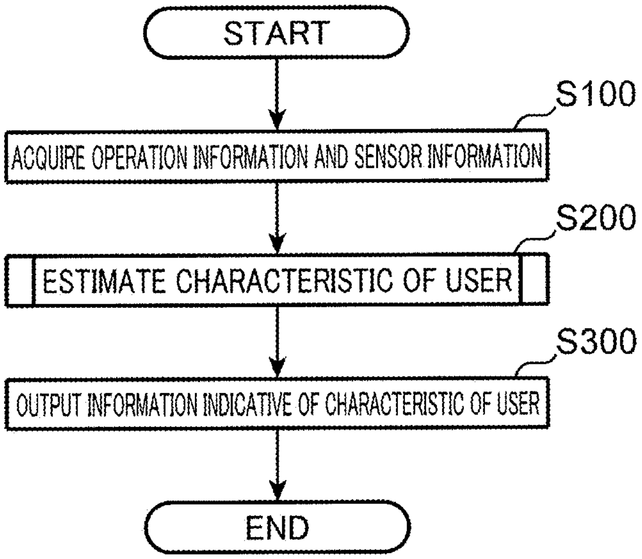
FIG. 3 is a flowchart showing an exemplary characteristic output process.

Hereinafter, a flow of the characteristic output process executed by the information processing device 1 will be described. The characteristic output process is a process of estimating a characteristic of a user of the information processing system 100 on the basis of operation information and sensor information and outputting characteristic information of the user. FIG. 3 is a flowchart showing an exemplary characteristic output process. The characteristic output process is executed, for example, every predetermined period, e.g., every day, every week, or every month. However, the process is not limited thereto. The characteristic output process may be executed each time operation information is acquired by the processor 12.

First, in Step S100, after completion of a previous characteristic output process, the first acquisition part 121 acquires operation information stored in the operation information storage part 133 and sensor information stored in the sensor information storage part 134.

FIG. 4 is a table showing exemplary operation information. For example, FIG. 4 shows operation information acquired in Step S100 of a characteristic output process which has started at 6 o'clock on Sep. 1, 2021, after the completion of a previous characteristic output process which started at 6 o'clock on Aug. 31, 2021. The operation information indicates, for example, that a user whose user ID is "User A" executed an operation of turning on a device 3 whose device ID is "Light 1" at 07:05:30 on Aug. 31, 2021.

As described above, there is a case that no user ID of the user who operated the device 3 or equipment 5 is included in the operation information stored in the operation information storage part 133. In this case, the first acquisition part 121 collates sensor information including a detection date and time coinciding with an operation date and time included in the operation information. The coincidence includes an agreement in a certain permissible range. The same is done in the description hereinafter. The first acquisition part 121 collates the detection information included in the sensor information with the reference data stored in the user information storage part 132 and identifies the user who operated the device 3 or equipment 5 in the space 40 indicated by the detection information. The first acquisition part 121 acquires the user ID of the identified user as the user ID included in the operation information.

Next, in Step S200, the processor 12 takes each of the users associated with one or more user IDs included in the operation information acquired in Step S100 as the target, and executes a process (hereinafter, characteristic estimation process) of estimating a characteristic of a user who is a target (hereinafter, target user) to be estimated.

In the characteristic estimation process, a characteristic of the target user in the time of being alone in the space 40 is estimated, and first characteristic information indicative of the characteristic is updated. Further, in the characteristic estimation process, a characteristic of the target user in the presence of a user (an other user) other than the target user in the space 40 where the target user is present is estimated, and second characteristic information indicative of the characteristic is updated. Details on the characteristic estimation process will be described later.

Next, in Step S300, the output part 125 outputs at least one of the first characteristic information and the second characteristic information of each target user.

Specifically, in Step S300, the output part 125 sends (outputs) at least one of the first characteristic information and the second characteristic information of each target user which is updated in Step S200 to a predetermined external device such as the output device 6 (FIG. 1) using the communication circuit 11. However, the process is not limited thereto. In Step S300, the output part 125 may send (output) at least one of first characteristic information and second characteristic information of each target user stored in the user information storage part 132 to a predetermined external device such as the output device 6 (FIG. 1) using the communication circuit 11 irrespective of whether the information is updated or not in Step S200.

Flow of Characteristic Estimation Process

Figure 5:
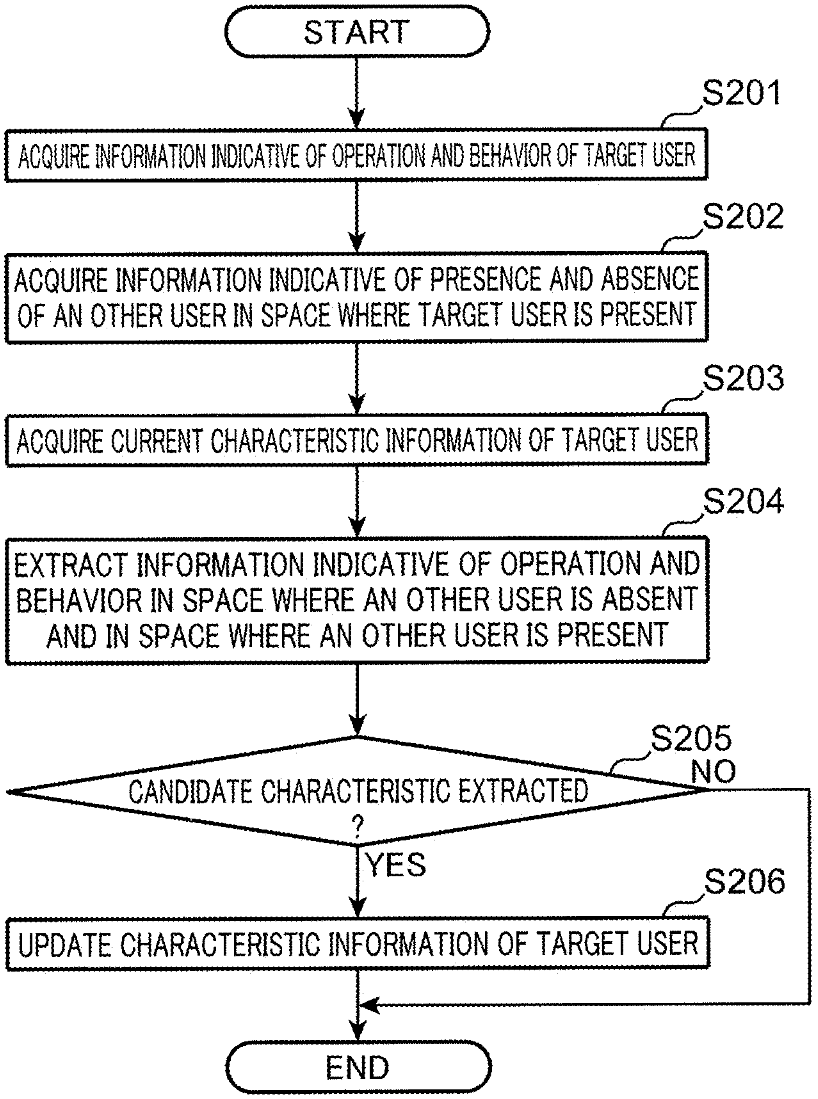
FIG. 5 is a flowchart showing an exemplary characteristic estimation process.

Hereinafter, details on the characteristic estimation process in Step S200 will be described. FIG. 5 is a flowchart showing an exemplary characteristic estimation process. For example, in a case that the operation information shown in FIG. 4 is acquired in Step S100, the processor 12 executes a characteristic estimation process of estimating a characteristic of the user who has user ID "User A" included in the operation information and is the target user. Further, the processor 12 executes a characteristic estimation process of estimating a characteristic of a user who has user ID "User B" included in the operation information and is the target user.

First, in Step S201, the first acquisition part 121 acquires operation information (first information) indicative of an operation (device operation) of the device 3 or equipment 5 of the target user in a period after the completion of the previous characteristic output process and sensor information (first information) indicative of a behavior of the target user in the period.

Specifically, in Step S201, the first acquisition part 121 acquires a piece of operation information including a user ID of the target user from the operation information acquired in Step S100. Hereinafter, a piece of the operation information indicative of an operation to the device 3 or equipment 5 of the target user which is acquired in Step S201 is called as operation history information.

The first acquisition part 121 acquires a sensor ID of the sensor 7 provided in the space 40 provided with the device 3 or equipment 5 whose device ID is included in the operation history information with reference to the device information stored in the device information storage part 131. The first acquisition part 121 acquires a piece of sensor information including the sensor ID and also including a detection date and time that coincides with an operation date and time included in the operation history information from the sensor information acquired in Step S100. Hereinafter, a piece of the sensor information indicative of a behavior of the target user which is acquired in Step S201 is called as behavior history information.

Next, in Step S202, the second acquisition part 122 acquires information (second information) indicative of a presence or absence of an other user in the space 40 where the target user is present in the period after the completion of the previous characteristic output process. Hereinafter, information indicative of a presence or absence of an other user in the space 40 where the target user is present to be acquired in Step S202 is called as presence history information.

Specifically, in Step S202, the second acquisition part 122 acquires a space ID of the space 40 provided with the sensor 7 whose sensor ID is included in the behavior history information as the space ID of the space 40 where the target user is present with reference to the device information stored in the device information storage part 131. The second acquisition part 122 collates the detection information included in the behavior history information with the reference data stored in the user information storage part 132 to thereby identify one or more persons who are in the space 40 where the target user is present.

When it is determined that the target user is alone, the second acquisition part 122 acquires information that associates the detection date and time included in the behavior history information, the space ID of the space 40 where the target user is present, and information (hereinafter, solo flag) indicative of the absence of the other user to one another as the presence history information.

On the other hand, when it is determined that there are the target user and a user whose user ID is different from the target user, the second acquisition part 122 acquires information that associates the detection date and time included in the behavior history information, the space ID of the space 40 where the target user is present, the user ID of the other user, and information (hereinafter, multi flag) indicative of the presence of the other user to one another as the presence history information.

Further, when it is determined that there is the target user and a person unidentifiable on the basis of the reference data, the second acquisition part 122 acquires information that associates the detection date and time included in the behavior history information, the space ID of the space 40 where the target user is present, and the multi flag to one another as the presence history information.

Next, in Step S203, the estimation part 124 acquires current characteristic information of the target user. Specifically, the estimation part 124 acquires first characteristic information and second characteristic information of the target user stored in the user information storage part 132.

FIG. 6 is a table showing exemplary first characteristic information. The first characteristic information is information indicative of a characteristic (hereinafter, first characteristic) of the target user when being alone in the space 40. The first characteristic information is information that associates one or more constituent traits included in the first characteristic with intensities of respective constituent traits. The first characteristic information shown in FIG. 6 indicates that the target user shows five constituent traits, i.e., "negligent", "spendthrift", "tidy", "nervous", and "sensitive to heat" when being alone in the space 40, and the respective intensities of the constituent traits are "0.3", "0.2", "0.3", "0.1", and "0.1".

In this embodiment, a greater value of intensity indicates a greater intensity with which the target user displays a constituent trait. The same can be said about the description hereinafter. In other words, the first characteristic information shown in FIG. 6 indicates that the target user displays the traits "negligent" and "tidy" most intensively when being alone in the space 40.

FIG. 7 is a table showing exemplary second characteristic information. As shown in FIG. 7, the second characteristic information is information indicative of a characteristic (hereinafter, second characteristic) of the target user when an other user is present in the space 40 where the target user is present. The second characteristic information is information that associates one or more constituent traits included in the second characteristic with intensities of respective constituent traits in the same manner as the first characteristic information. The second characteristic information shown in FIG. 7 indicates that the target user displays five constituent traits, i.e., "negligent", "thrifty", "tidy", "nervous", and "communicative" when an other user is present in the space 40 where the target user is present, and that the respective intensities of the constituent traits are "0.1", "0.1", "0.5", "0.1", and "0.2". In other words, the second characteristic information shown in FIG. 7 indicates that the target user displays the trait "tidy" most intensively when an other user is present in the space 40 where the target user is present.

Next, in Step S204, the extraction part 123 extracts information indicative of an operation to the device 3 or equipment 5 and a behavior of the target user in each of the space 40 (hereinafter, first environment) where an other user is absent and the space 40 (hereinafter, second environment)

where an other user is present from the operation history information and the behavior history information which are acquired in Step S201 in view of the presence history information which is acquired in Step S202.

Specifically, in Step S204, the extraction part 123 determines whether the solo flag or the multi flag is included in the presence history information including the detection date and time coinciding with the operation date and time included in the operation history information and the space ID of the space 40 provided with the device 3 or equipment 5 whose device ID is included in the operation history information with reference to the device information stored in the device information storage part 131.

When it is determined that the solo flag is included, the extraction part 123 extracts the operation history information as information (hereinafter, first operation history information) indicative of the operation to the device 3 or equipment 5 of the target user in the first environment. On the other hand, when it is determined that the multi flag is included, the extraction part 123 extracts the operation history information as information (hereinafter, second operation history information) indicative of the operation to the device 3 or equipment 5 of the target user in the second environment.

Further, the extraction part 123 determines whether the solo flag or the multi flag is included in the presence history information including the detection date and time coinciding with the detection date and time included in the behavior history information and the space ID of the space 40 provided with the sensor 7 whose sensor ID is included in the behavior history information with reference to the device information stored in the device information storage part 131.

When it is determined that the solo flag is included, the extraction part 123 extracts the behavior history information as information (hereinafter, first behavior history information) indicative of a behavior of the target user in the first environment. On the other hand, when it is determined that the multi flag is included, the extraction part 123 extracts the behavior history information as information (hereinafter, second behavior history information) indicative of the operation to a behavior of the target user in the second environment.

In other words, the first operation history information and the first behavior history information which are to be extracted in Step S204 are exemplary first action information of the present disclosure, and the second operation history information and the second behavior history information which are to be extracted in Step S204 are exemplary second action information of the present disclosure.

Next, in Step S205, the estimation part 124 extracts a candidate trait estimated to be a constituent trait of a first characteristic that is a characteristic of the target user who is in the first environment and a second characteristic that is a characteristic of the target user who is in the second environment on the basis of the information extracted in Step S204.

Specifically, in Step S205, the estimation part 124 acquires from the rule information storage part 135 first rule information defining a relationship between one or more candidate traits which is for constituent traits and one or more feature groups indicative of features of an operation to the device 3 or equipment 5, or a behavior.

FIG. 8 is a table showing exemplary first rule information defining a relationship between one or more candidate traits and one or more feature groups each indicative of features of operations to a device 3 or equipment 5. In the first rule information shown in FIG. 8, eight candidate traits are associated with respective feature groups each indicative of two features of operations to the device 3 or equipment 5 of a user who has the candidate traits as the constituent traits.

For example, in the first rule information shown in FIG. 8, the candidate trait "negligent" is associated with a feature group indicative of a feature "less operating the light" concerning the operation to the light and a feature "long refrigerator door opening duration" concerning the operation to the refrigerator of the user who has the candidate trait "negligent" as the constituent trait.

FIG. 9 is a table showing exemplary first rule information defining a relationship between one or more candidate traits and one or more feature groups indicative of features of behaviors. In the first rule information shown in FIG. 9, eight candidate traits are associated with respective feature groups each indicative of two features of behaviors of a user who has the candidate traits as the constituent traits.

For example, in the first rule information shown in FIG. 9, the candidate trait "negligent" is associated with a feature group indicative of a feature of behavior "messy desk" and a feature of behavior "less folding the laundry" of the user who has the candidate trait "negligent" as the constituent trait.

The number of features included in a feature group in the first rule information is not limited to two but may be one, or three or more. However, the number of features included in a feature group in the first rule information is preferably two or more since a single feature of an operation to the device 3 or equipment 5, or a behavior of a user does not always evidently reflect an intention and a taste of the user.

Next, the estimation part 124 extracts a candidate trait estimated to be a constituent trait of a first characteristic of the target user on the basis of the first operation history information and the first behavior history information which are extracted in Step S204 with reference to the first rule information.

Specifically, the estimation part 124 determines whether the operations to the device 3 or equipment 5 of the target user in the first environment indicated by the first operation history information include the operations to the device 3 or equipment 5 showing one or more feature groups (first feature groups) included in the first rule information with reference to the first rule information shown in FIG. 8.

Inclusion of operations to the device 3 or equipment 5 showing the feature group means that the numbers of executions of all the operations to the device 3 or equipment 5 respectively showing the one or more features included in the feature group are one or more. The information indicating an operation to the device 3 or equipment 5 showing each feature is stored in the rule information storage part 135. The estimation part 124 executes the determination with reference to the information.

When it is determined that operations to a device 3 or equipment 5 showing one or more feature groups are included, the estimation part 124 specifies one or more candidate traits (first candidate traits) associated with the one or more feature groups in the first rule information. The estimation part 124 estimates the specified one or more candidate traits to be constituent traits of the first characteristic of the target user and extracts the one or more candidate traits.

For example, in a case that the operations to the device 3 or equipment 5 of the target user in the first environment indicated by the first operation history information include one or more executions of the operation to the light showing the feature "less operating the light" and also one or more executions of the operation to the refrigerator showing the feature "long refrigerator door opening duration", both features being included in the feature group associated with the candidate trait "negligent" included in the first rule information shown in FIG. 8, the estimation part 124 estimates the candidate trait "negligent" associated with the feature group in the first rule information to be a constituent trait of the first characteristic of the target user and extracts the candidate trait "negligent".

The operation to the light showing the feature "less operating the light" indicates, for example, an operation of turning on and off the light a predetermined number of times (e.g., two) or less per day. However, the operation is not limited thereto. The operation may be a set of operations in which a ratio of the number of turning on and off times of the light to the number of user absenting times of the space 40 provided with the light is a predetermined value (e.g., 0.7) or smaller. The number of user absenting times of the space 40 provided with the light may be acquired with reference to the device information stored in the device information storage part 131 and first behavior history information including a detection date and time coinciding with the operation date and time included in the first operation history information.

On the other hand, the operation to the refrigerator showing the feature "long refrigerator door opening duration" indicates, for example, an operation in which an average refrigerator door opening duration per day is a predetermined duration or more. However, the definition is not limited thereto. The operation may be a set of operations in which a ratio of the number of alarming times for excessive refrigerator door opening duration after a door opening of the refrigerator by the user to the number of door opening times of the refrigerator by the user is a predetermined value (e.g., 0.3) or more.

Similarly, with reference to the first rule information shown in FIG. 9, the estimation part 124 determines whether behaviors of the target user in the first environment indicated by the first behavior history information include behaviors showing one or more feature groups (first feature groups) included in the first rule information.

Inclusion of behaviors showing a feature group means that the numbers of executions of all the behaviors respectively showing one or more features included in the feature group are one or more. The information indicating a behavior showing each feature is stored in the rule information storage part 135. The estimation part 124 executes the determination with reference to the information.

When it is determined that behaviors showing one or more feature groups are included, the estimation part 124 specifies one or more candidate traits (first candidate traits) associated with the one or more feature groups in the first rule information. The estimation part 124 estimates the specified one or more candidate traits to be constituent traits of the first characteristic of the target user and extracts the one or more candidate traits.

For example, in a case that the behaviors of the target user in the first environment indicated by the first behavior history information include one or more executions of the behavior showing the feature "messy desk" and also one or more executions of the behavior showing the feature "less folding the laundry", both features being included in the feature group associated with the candidate trait "negligent" included in the first rule information shown in FIG. 9, the estimation part 124 estimates the candidate trait "negligent" associated with the feature group in the first rule information to be a constituent trait of the first characteristic of the target user and extracts the candidate trait "negligent".

The behavior showing the feature "messy desk" indicates, for example, a behavior according to which a predetermined number of objects or more are left on a desk for a certain duration or more. The behavior showing the feature "less folding the laundry" indicates, for example, a behavior in which a ratio of the number of wearing times of unfolded clothes to the number of wearing times of clothes is a predetermined value or more.

Similarly to the above, the estimation part 124 determines whether the operations to the device 3 or equipment 5 of the target user in the second environment indicated by second operation history information include the operations to the device 3 or equipment 5 showing one or more feature groups (second feature groups) included in the first rule information with reference to the first rule information shown in FIG. 8. When it is determined that operations to the device 3 or equipment 5 showing one or more feature groups are included, the estimation part 124 specifies one or more candidate traits (second candidate traits) associated with the one or more feature groups in the first rule information. The estimation part 124 estimates the specified one or more candidate traits as the constituent traits of the second characteristic of the target user and extracts the one or more candidate traits.

Further, the estimation part 124 determines whether the behaviors of the target user in the second environment indicated by the second behavior history information include behaviors showing one or more feature groups (second feature groups) included in the first rule information with reference to the first rule information shown in FIG. 9. When it is determined that behaviors showing one or more feature groups are included, the estimation part 124 estimates the one or more candidate traits (second candidate traits) associated with the one or more feature groups in the first rule information to be the constituent traits of the second characteristic of the target user and extracts the one or more candidate traits.

In Step S205, the estimation part 124 may omit the extraction of a candidate trait based on one of the first operation history information and the first behavior history information which are to be extracted in Step S204. Similarly, the estimation part 124 may omit the extraction of a candidate trait based on one of the second operation history information and the second behavior history information which are to be extracted in Step S204.

In a case that no candidate trait is extracted in Step S205 (NO in Step S205), the characteristic estimation process ends without an update of the first characteristic information and the second characteristic information which are acquired in Step S203.

On the other hand, in a case that one or more candidate traits estimated to be constituent traits of the characteristic of the target user who is in at least one of the first environment and the second environment are extracted in Step S205 (YES in Step S205), in Step S206, the estimation part 124 updates one of the first characteristic information and the second characteristic information acquired in Step S203, which is characteristic information showing the characteristic of the target user who is in at least one of the environments, and ends the characteristic estimation process.

Specifically, in a case that a candidate trait estimated to be a constituent trait of the first characteristic is extracted in Step S205, and the candidate trait is not yet included in the first characteristic indicated by the first characteristic information, the estimation part 124 adds this candidate trait as a constituent trait of the first characteristic in Step S206. Further, the estimation part 124 updates (sets) an intensity of each of the constituent traits included in the first characteristic and updates the first characteristic information stored in the user information storage part 132 with the first characteristic information indicative of the updated first characteristic.

On the other hand, in a case that a candidate trait estimated to be a constituent trait of the second characteristic is extracted in Step S205, and the candidate trait is not yet included in the second characteristic indicated by the second characteristic information, the estimation part 124 adds this candidate trait as a constituent trait of the second characteristic in Step S206. Further, the estimation part 124 updates (sets) an intensity of each of the constituent traits included in the second characteristic and updates the second characteristic information stored in the user information storage part 132 with the second characteristic information indicative of the updated second characteristic.

Hereinafter, details on Step S206 will be described. Details on the processing of Step S206 to be executed in the case that a candidate trait estimated to be a constituent trait (a first constituent trait) of the first characteristic is extracted in Step S205 are the same as the processing of Step S206 to be executed in the case that a candidate trait estimated to be a constituent trait (a second constituent trait) of the second characteristic is extracted in Step S205.

Therefore, details on Step S206 to be executed in a case that a candidate trait "negligent" is extracted as the candidate trait estimated to be a constituent trait of the second characteristic in Step S205 will be described hereinafter. The description of the details on Step S206 to be executed in the case that a candidate trait estimated to be a constituent trait of the first characteristic is extracted in Step S205 is omitted.

FIG. 10 is a table showing exemplary relationships between traits of a target user and execution numbers of distinctive actions showing respective constituent traits before an update. FIG. 10 shows exemplary relationships between the second characteristic information indicative of the second characteristic of the target user shown in FIG. 7 and execution numbers of the distinctive actions showing respective constituent traits included in the second characteristic. The execution numbers of the distinctive actions showing respective constituent traits included in the second characteristic are stored in the user information storage part 132 in association with the second characteristic information indicative of the second characteristic.

The distinctive actions showing the respective constituent traits indicate operations to a device 3 or equipment 5 or behaviors showing a feature group associated with a candidate trait indicative of each constituent trait in the first rule information. For example, distinctive actions showing the constituent trait "negligent" indicate an operation to the light and an operation to the refrigerator respectively showing two features "less operating the light" and "long refrigerator door opening duration" which are associated with the candidate trait "negligent" in the first rule information (FIG. 8). Further, distinctive actions showing the candidate trait "negligent" indicate behaviors respectively showing two features "messy desk" and "less folding the laundry" which are associated with the candidate trait "negligent" in the first rule information (FIG. 9).

The execution number of the distinctive action showing the constituent trait "negligent" included in the second characteristic is the smallest value in the respective execution numbers of the operation to the light and the operation to the refrigerator, which are the distinctive actions in the operation to the device 3 or equipment 5 by the target user in the second environment indicated by the second operation history information, and the execution numbers of the behaviors, which are the distinctive actions in the behavior of the target user in the second environment indicated by the second behavior history information.

In other words, the execution number of the distinctive action showing each constituent trait is the smallest value in the execution numbers of operations to a device 3 or equipment 5 and behaviors showing each feature included in a feature group associated with a candidate trait indicative of each constituent trait. However, the process is not limited thereto. The execution number of the distinctive action showing each constituent trait may be an average value of or the largest value in the execution numbers of the operations to the device 3 or equipment 5 and behaviors showing each feature included in the feature group associated with the candidate trait indicative of each constituent trait.

In Step S206, the estimation part 124 calculates an execution number of a distinctive action (second distinctive action) showing a constituent trait indicative of the candidate trait which is included in the second characteristic and is extracted in Step S205 with reference to the second operation history information and the second behavior history information. The estimation part 124 adds the currently calculated execution number of the distinctive action showing the constituent trait to the execution number of the distinctive action showing the constituent trait included in the second characteristic stored in the user information storage part 132.

FIG. 11 is a table showing exemplary relationships between traits of the target user and execution numbers of distinctive actions showing respective constituent traits after an update. FIG. 11 shows "11 times" that is a result obtained by the estimation part 124 in Step S206, specifically, the estimation part 124 calculates "1 time" as an execution number of the distinctive action showing the constituent trait "negligent", and adds the execution number of "1 time" to an execution number of the distinctive action showing the constituent trait "negligent" included in the second characteristic shown in FIG. 10.

Thereafter, the estimation part 124 sets an intensity of each of the constituent traits included in the second characteristic information on the basis of the execution numbers of the distinctive actions showing the respective constituent traits included in the second characteristic.

Specifically, the estimation part 124 sets a ratio of an execution number of a distinctive action showing each constituent trait included in the second characteristic to a sum of execution numbers of one or more distinctive actions respectively showing the one or more constituent traits included in the second characteristic as an intensity of each of the constituent traits. Consequently, the sum of the intensities of the respective constituent traits included in the second characteristic is 1 and is thus normalized.

In the example shown in FIG. 11, the sum of execution numbers of five distinctive actions showing five constituent traits included in the second characteristic is 101 times (=11 times+10 times+50 times+10 times+20 times). Accordingly, the estimation part 124 sets the ratio "0.109 (=11 times/101 times)" of the execution number "11 times" of the distinctive action showing the constituent trait "negligent" to the sum "101 times" as the intensity of the constituent trait "negligent".

Similarly, the estimation part 124 sets ratios "0.099", "0.495", "0.099", "0.198" of the respective execution numbers “10 times”, “50 times”, “10 times”, and “20 times” of the distinctive actions respectively showing the constituent traits “thrifty”, “tidy”, “nervous”, and “communicative” to the sum “101 times” of the execution numbers of the five distinctive actions showing five constituent traits included in the second characteristic as the respective intensities of the constituent traits “thrifty”, “tidy”, “nervous”, and “communicative”.

The way of setting the intensity of each constituent trait included in the second characteristic is not limited thereto. For example, the estimation part 124 may set the execution number (e.g., “11 times”) of the distinctive action showing each constituent trait (e.g., “negligent”) included in the second characteristic as the intensity of each constituent trait included in the second characteristic.

The configuration of the first embodiment may adopt the following modifications.

(1) In the first embodiment, the description is made about the example in which the intensity of each of the constituent traits included in the first characteristic and the second characteristic is set using the execution number of the distinctive action associated with each of the constituent traits in Step S206. However, for example, the operation to the light and the operation to the refrigerator, which are distinctive actions showing the constituent trait “negligent”, are likely to be executed a plurality of times per day. In contrast, for example, distinctive actions showing the constituent trait “well-regulated” include an operation to the light and an operation to a coffee maker, which are the first operations to be executed by the target user after the rising and show two features “the light turned on at the same time every morning” and “the coffee maker activated at the same time”, which are associated with the candidate trait “well-regulated” in the first rule information (FIG. 8). This distinctive action is executed only one time per day.

In the first embodiment, in a case that the respective execution time of the distinctive actions showing the constituent traits “negligent” and “well-regulated” which are obtainable from the first operation history information of one day are “1 time”, the respective intensities of the constituent traits are updated by weighting using the same execution number “1 time” although the execution numbers per day are liable to be different from each other as described above.

Accordingly, as described below, it may be appreciated to update an intensity of each of constituent traits by the same weighting on the basis of an execution number of a distinctive action associated with each of respective constituent traits per a predetermined time by a different user from the target user.

Specifically, in Step S206, the estimation part 124 calculates an execution number (second execution number) per a predetermined time (e.g., per day) of a distinctive action associated with a constituent trait which is included in the second characteristic of the target user and shows the candidate trait extracted in Step S205 with reference to the second operation history information and the second behavior history information. Hereinafter, for convenience of explanation, the distinctive action associated with the constituent trait which is included in the second characteristic of the target user and shows the candidate trait extracted in Step S205 is called as a target distinctive action.

The estimation part 124 acquires from the operation information storage part 133 operation information including user IDs of one or more users (one or more other users) other than the target user as information (hereinafter, third operation history information) indicative of operations to the device 3 or equipment 5 by the one or more users. Further, the estimation part 124 acquires from the sensor information storage part 134 sensor information including a detection date and time that coincides with an operation date and time included in the third operation history information and a space ID of the space 40 provided with the device 3 or equipment 5 whose device ID is included in the third operation history information as information (hereinafter, third behavior history information) indicative of behaviors of the one or more users. In other words, the third operation history information and the third behavior history information are examples of the third action information of the present disclosure.

The estimation part 124 calculates respective execution numbers per the predetermined time of the target distinctive action of the one or more users other than the target user with reference to the third operation history information and the third behavior history information, and then calculates an average (second average) of the execution numbers.

The estimation part 124 adds a result which is obtained by dividing the execution number per the predetermined time of the target distinctive action calculated with reference to the second operation history information and the second behavior history information by the average to the execution number of the target distinctive action that is stored in the user information storage part 132.

Similarly, the estimation part 124 updates the execution number of the distinctive action associated with the constituent trait that is included in the first characteristic of the target user and that shows the candidate trait extracted in Step S205.

(2) In the first embodiment, the description is made about the example in which in Step S100 (FIG. 3), the first acquisition part 121 acquires the operation information stored in the operation information storage part 133 and the sensor information stored in the sensor information storage part 134 after the completion of the previous characteristic output process. However, in place of this processing, in Step S100, the first acquisition part 121 may acquire operation information stored in the operation information storage part 133 and sensor information stored in the sensor information storage part 134 in a first predetermined period. The first predetermined period is, for example, the last one week, one month, three months, or one year.

Accordingly, in Step S201, the first acquisition part 121 may acquire the operation information (first information) indicative of the operation to the device 3 and the equipment 5 by the target user and the sensor information (first information) indicative of the behavior of the target user in the first predetermined period. Thereafter, in Step S202, the second acquisition part 122 may acquire presence history information (second information) indicative of a history of presence and absence of an other user in the space 40 where the target user exists in the first predetermined period.

(3) In the first embodiment and the above modifications, the description is made about the examples in which the intensity of each of the constituent traits included in the first characteristic and the second characteristic of the target user on the basis of the operation history information and the behavior history information which are acquired in Step S201 by executing the characteristic output process. However, as another way, each of the constituent traits included in the first characteristic and the second characteristic and its intensity set in the characteristic output process may be updated on the basis of the operation to the device 3 or equipment 5 and the behavior by and of the target user. This configuration may be implemented, for example, in the following manner.

Specifically, the estimation part 124 refers to the first characteristic information and the second characteristic information of each of the users which are stored in the user information storage part 132 every predetermined time, e.g., once a day. The estimation part 124 refers to operation information including the user ID of each of the users stored in the operation information storage part 133. Further, the estimation part 124 refers to sensor information which is stored in the sensor information storage part 134 and includes a detection date and time coinciding with an operation date and time included in the operation information and a space ID of a space 40 provided with a device 3 or equipment 5 whose device ID is included in the operation information.

In a case that the first characteristic information of each of the users indicates no distinctive action associated with a constituent trait included in the first characteristic information in a first predetermined time or longer, the estimation part 124 excludes the constituent trait from the first characteristic or reduces the intensity of the constituent trait by a predetermined first reduction rate. Similarly, in a case that the second characteristic information of each of the users indicates no distinctive action associated with a constituent trait included in the second characteristic information in a second predetermined time or longer, the estimation part 124 excludes the constituent trait from the second characteristic or reduces the intensity of the constituent trait by a predetermined second reduction rate. In this way, it is possible to exclude the improper constituent trait from the first characteristic and the second characteristic of each of the users or reduce the intensity of the improper constituent trait to improve the intensity of constituent traits other than the improper constituent trait thereby relatively in the first characteristic and the second characteristic.

The first predetermined time and the second predetermined time are, for example, three days, one week, one month, three months, or one year. The first predetermined time and the second predetermined time may be the same or may be different. The first reduction rate and the second reduction rate are, for example, 10%. The first reduction rate and the second reduction rate may be the same or may be different.

Further, the first predetermined time and the second predetermined time may be determined on the basis of the execution frequency of the distinctive action associated with the constituent trait. For example, in a case that the estimation part 124 determines that no distinctive action associated with the constituent trait "negligent" is executed in three days in the determination as to whether the distinctive action associated with the constituent trait "negligent" is executed in the first predetermined time (second predetermined time) or longer, the estimation part 124 may set the first predetermined time (the second predetermined time) used for next determination as to whether to exclude the constituent trait "negligent" or reduce the intensity of the constituent trait "negligent" at three days.

Further, in the modification, the estimation part 124 may normalize the intensity of the constituent trait included in the first characteristic and the second characteristic after the exclusion of the constituent trait from the first characteristic and the second characteristic, or after the reduction of the intensity of the constituent trait included in the first characteristic and the second characteristic.

Specifically, the estimation part 124 may calculate a ratio of the intensity of the constituent trait included in the first characteristic to a sum of the intensities of the one or more constituent traits included in the first characteristic after the exclusion or the reduction, and reset the intensity of each constituent trait included in the first characteristic at the ratio. Similarly, the estimation part 124 may calculate a ratio of the intensity of the constituent trait included in the second characteristic to a sum of the intensities of the one or more constituent traits included in the second characteristic after the exclusion or the reduction, and reset the intensity of each constituent trait included in the second characteristic at the ratio.

Figure 12:
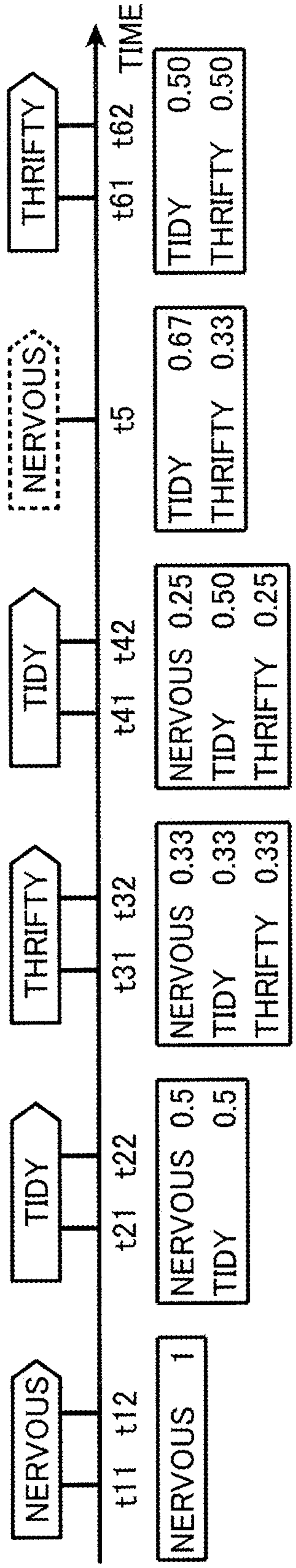
FIG. 12 shows exemplary changes in characteristic information.

FIG. 12 shows an exemplary series of changes in the characteristic information. For example, FIG. 12 shows an occasion in which a characteristic output process is executed at a time t12. Specifically, the first operation history information and the first behavior history information indicative of the operation to the device 3 or equipment 5 and the behavior in a period from a time t11 to the time t12 indicate that the distinctive action associated with the candidate trait "nervous" is executed one time. Accordingly, the constituent trait "nervous" is added in the first characteristic and the intensity of the constituent trait "nervous" is calculated as "1.0".

In FIG. 12 is shown another occasion in which another characteristic output process is executed at a time t22 after the time t12. The first operation history information and the first behavior history information indicative of the operation to the device 3 or equipment 5 and the behavior in a period from a time t21 to the time t22 indicate that the distinctive action associated with the candidate trait "tidy" is executed one time, and the constituent trait "tidy" is added in the first characteristic. Accordingly, the intensity of the constituent trait "tidy" is calculated as "0.5 (=1 time/(1 time+1 time))" and the intensity of the constituent trait "nervous" is calculated as "0.5 (=1 time/(1 time+1 time))".

FIG. 12 shows subsequent occasions in which characteristic output processes are executed to update the first characteristic information at a time t32 and a time t42, and further the constituent trait "nervous" is excluded from the first characteristic information at a time t5 because of no execution of the distinctive action associated with the constituent trait "nervous" in the first predetermined time. Further, FIG. 12 shows resetting of the intensities of the constituent traits "tidy" and "thrifty" included in the first characteristic to "0.67 (=2 times/(2 times+1 time))" and "0.33 (=1 time (2 times+1 time))" respectively, because of the exclusion of the constituent trait "nervous" from the first characteristic information at the time t5.

FIG. 12 shows further subsequent occasion in which a still another characteristic output process is executed at a time t62 and the intensities of the constituent traits "tidy" and "thrifty" included in the first characteristic information are set to "0.50 (=2 times/(2 times+2 times))" and "0.50 (=2 times/(2 times+2 times))" respectively, because of "one-time" execution of the distinctive action associated with the constituent trait "thrifty" of the target user.

(4) In the first embodiment and the above modifications, the description is made about the example in which the first characteristic is updated based on the operation to the device 3 or equipment 5 and the behavior by and of the target user in the first environment where an other user is absent and the second characteristic is updated based on the operation to the device 3 or equipment 5 and the behavior by and of the target user in the second environment where an other user is present.

However, it may be appreciated to predetermine a candidate trait (hereinafter, common candidate trait) for a constituent trait (hereinafter, common constituent trait) which is possessed by the target user in both the first environment and the second environment. Accordingly, in a case that a distinctive action (hereinafter, common distinctive action) associated with the common candidate trait is included in an operation to the device 3 or equipment 5 or a behavior by or of the target user in at least one of the first environment and the second environment, the common candidate trait may be estimated to be the common constituent trait included in the first characteristic and the second characteristic in common, and added to the first characteristic and the second characteristic.

In this case, the intensity of the common constituent trait included in the first characteristic and the second characteristic may be set on the basis of a sum of the execution numbers of the common distinctive action in the operation to the device 3 or equipment 5 and the behavior by and of the target user irrespective of whether the target user was in the first environment or in the second environment. This process may be implemented, for example, in the following manner.

In Step S205 (FIG. 5), the estimation part 124 determines whether a common distinctive action is included in any one of the first operation history information, the first behavior history information, the second operation history information, and the second behavior history information.

When it is determined that the common distinctive action is included, the estimation part 124 estimates the common candidate trait to be the common constituent trait included in the first characteristic and the second characteristic. Thereafter, the estimation part 124 adds the common candidate trait to the one of the first characteristic and the second characteristic which does not include the constituent trait corresponding to the common candidate trait as the common constituent trait included in the first characteristic and the second characteristic.

In this case, the estimation part 124 calculates an execution number (hereinafter, first execution number) of the common distinctive action on the basis of the first operation history information and the first behavior history information, and calculates an execution number (hereinafter, second execution number) of the common distinctive action on the basis of the second operation history information and the second behavior history information. In a case that an execution number of the common distinctive action is not stored in association with the user information of the target user in the user information storage part 132, the estimation part 124 stores the sum of the first execution number and the second execution number in association with the user information of the target user in the user information storage part 132 as the execution number of the common distinctive action. In a case that an execution number of the common distinctive action is stored in association with the user information of the target user in the user information storage part 132, the estimation part 124 adds the sum of the first execution number and the second execution number to the execution number.

Further, the estimation part 124 calculates an intensity of the common constituent trait included in the first characteristic using the execution number of the common distinctive action stored in association with the user information of the target user, and an intensity of each of the other constituent traits included in the first characteristic using the execution number of a distinctive action showing each of the other constituent traits stored in association with the first characteristic in the same manner as in the first embodiment.

Similarly, the estimation part 124 calculates an intensity of the common constituent trait included in the second characteristic using the execution number of the common distinctive action stored in association with the user information of the target user, and an intensity of each of the other constituent traits included in the second characteristic using the execution number of a distinctive action showing each of the constituent traits stored in association with the second characteristic.

(5) In the above modification (4), the description is made about an example in which the intensity of the common constituent trait included in the first characteristic and the second characteristic is calculated by the use of the sum of the execution number (first execution number) of the common distinctive action calculated on the basis of the first operation history information and the first behavior history information and the execution number (second execution number) of the common distinctive action calculated on the basis of the second operation history information and the second behavior history information.

In this case, the execution number of the common distinctive action is calculated on the basis of the operation to devices 3 and the like and the behavior by and of the target user in a total period in which the target user is in the first environment and in the second environment. On the other hand, the execution number of each of distinctive actions showing the other constituent traits included in the first characteristic and the second characteristic are calculated on the basis of an operation to the device 3 and the like and a behavior by and of the target user in the period in which the target user is in the first environment or in the second environment. The period is shorter than the period in which the execution number of the common distinctive action is calculated. Therefore, in each of the first characteristic and the second characteristic, the intensity of the common constituent trait is liable to be greater than the intensity of each of the other constituent traits.

In view thereof, the modification (4) may be further changed to set the intensity of the common constituent trait included in the first characteristic and the second characteristic on the basis of the execution numbers of common distinctive actions which are allotted in proportion to respective presence durations of the target user in the first environment and in the second environment. This process may be implemented, for example, in the following manner.

With the configuration of the modification (4), the estimation part 124 may further calculate a time elapsed from an earliest date and time to a latest date and time among the operation date and time included in the first operation history information and the first behavior history information as a duration (hereinafter, first time) of the presence of the target user in the first environment. Similarly, the estimation part 124 calculates a time elapsed from an earliest date and time to a latest date and time among the operation date and time included in the second operation history information and the second behavior history information as a duration (hereinafter, second time) of the presence of the target user in the second environment.

The estimation part 124 performs a calculation of dividing a product of the first time and a sum of the first execution number and the second execution number by a sum of the first time and the second time to obtain an execution number of the common distinctive action in the first environment. The estimation part 124 performs a calculation of dividing a product of the second time and the sum of the first execution number and the second execution number by the sum of the first time and the second time to obtain an execution number of the common distinctive action in the second environment.

In a case that an execution number (hereinafter, first common execution number) of the common distinctive action in the first environment is not stored in association with the first characteristic information of the target user in the user information storage part 132, the estimation part 124 stores the calculated execution number of the common distinctive action in the first environment in association with the first characteristic information of the target user in the user information storage part 132 as the first common execution number. In a case that a first common execution number is stored in association with the first characteristic information of the target user in the user information storage part 132, the estimation part 124 adds the calculated execution number of the common distinctive action in the first environment to the first common execution number.

Similarly, in a case that an execution number (hereinafter, second common execution number) of the common distinctive action in the second environment is not stored in association with the second characteristic information of the target user in the user information storage part 132, the estimation part 124 stores the calculated execution number of the common distinctive action in the second environment in association with the second characteristic information of the target user in the user information storage part 132 as the second common execution number. In a case that a second common execution number is stored in association with the second characteristic information of the target user in the user information storage part 132, the estimation part 124 adds the calculated execution number of the common distinctive action in the second environment to the second common execution number.

Further, the estimation part 124 calculates the intensity of the common constituent trait included in the first characteristic using the first common execution number stored in association with the first characteristic information, and the intensity of each of the other constituent traits included in the first characteristic using the execution numbers of the respective distinctive actions showing the other candidate traits stored in association with the first characteristic information in the same manner as the first embodiment.

Similarly, the estimation part 124 calculates the intensity of the common constituent trait included in the second characteristic using the second common execution number stored in association with the second characteristic information, and the intensity of each of the other constituent traits included in the second characteristic using the execution numbers of the respective distinctive actions showing the other candidate traits stored in association with the second characteristic information.

(6) In the above modification (4), the description is made about an example in which a predetermined common candidate trait is estimated as a common constituent trait included in the first characteristic and the second characteristic in a case that the execution number of a common distinctive action showing the predetermined common candidate trait is one or more in the operation to the device 3 and the like and the behavior by and of the target user.

However, as another way, the estimation part 124 may refer to the first characteristic information and the second characteristic information of each of the users stored in the user information storage part 132 every predetermined time, e.g., once a day. Further, in a case that an identical constituent trait indicates close intensities in the first characteristic and the second characteristic, the estimation part 124 may estimate the identical constituent trait to be the common constituent trait included in the first characteristic and the second characteristic in common.

The identical constituent trait indicating close intensities means that the identical constituent traits indicate intensities which coincide with each other within a certain tolerance. For example, in a case that the constituent trait "negligent" included in the first characteristic and the constituent trait "negligent" included in the second characteristic indicate respective intensities which coincide with each other within a certain tolerance (e.g., 0.01), the estimation part 124 may estimate the constituent trait "negligent" to be a common constituent trait included in the first characteristic and the second characteristic in common.

Further, there is a case that a like distinctive action that is an operation to a device 3 or equipment 5 or a behavior (hereinafter, distinctive action) which shows one of the one or more feature groups included in the first rule information (FIG. 8, FIG. 9) and of which respective numbers of executions per a unit time in the first environment and the second environment are close to each other is included in the operation to the device 3 and the like or the behavior of each of the users. In this case, the estimation part 124 may estimate a candidate trait associated with the one feature group shown by the like distinctive action to be a common constituent trait included in the first characteristic and the second characteristic of each of the users. The numbers of executions per a unit time which are close to each other means that the numbers of executions per a unit time which coincide with each other within a predetermined tolerance. The like distinctive action may be specified, for example, in the following manner.

Specifically, in the same manner as in Step S201, the estimation part 124 acquires a piece of operation information (hereinafter, past operation information) including a user ID of each of the users from the operation information storage part 133, and acquires a piece of sensor information (hereinafter, past behavior information) including a detection date and time coinciding with an operation date and time included in the past operation information from the sensor information storage part 134.

The estimation part 124 collates detection information included in the past behavior information with the reference data stored in the user information storage part 132 to thereby identify one or more persons who are in the space 40 indicated by the detection information.

When it is determined that a user is alone in the space 40 indicated by the detection information, the estimation part 124 acquires the past behavior information including the detection information as information (hereinafter, first past behavior information) indicative of a behavior of the user in the first environment. On the other hand, when it is determined that there are a user and a user having a user ID different from the user, or alternatively, a user and a person unidentifiable on the basis of the reference data in the space 40 indicated by the detection data, the estimation part 124 acquires the past behavior information including the detection information as information (hereinafter, second past behavior information) indicative of a behavior of the user in the second environment.

The estimation part 124 acquires the past operation information including a device ID of a device 3 or equipment 5 provided in the same space 40 as a sensor 7 whose sensor ID is included in the first past behavior information and also an operation date and time coinciding with a detection date and time included in the first past behavior information as information (hereinafter, first past operation information) indicative of the operation to the device 3 or equipment 5 of each of the users in the first environment with reference to the device information stored in the device information storage part 131.

Similarly, the estimation part 124 acquires the past operation information including a device ID of a device 3 or equipment 5 provided in the same space 40 as a sensor 7 whose sensor ID is included in the second past behavior information and also an operation date and time coinciding with a detection date and time included in the second past behavior information as information (hereinafter, second past operation information) indicative of the operation to the device 3 or equipment 5 of each of the users in the second environment with reference to the device information stored in the device information storage part 131.

The estimation part 124 calculates the number of executions per unit time of each distinctive action associated with each feature group included in the first rule information (FIG. 8, FIG. 9) in an operation or a behavior of each user in the first environment indicated by the first past operation information and the first past behavior information as the number of executions per unit time of each distinctive action in the first environment. The estimation part 124 calculates the number of executions per unit time of each distinctive action associated with each feature group included in the first rule information (FIG. 8, FIG. 9) in an operation or a behavior of each user in the second environment indicated by the second past operation information and the second past behavior information as the number of executions per unit time of each distinctive action in the second environment.

The estimation part 124 determines whether the number of executions per unit time of one distinctive action in the first environment and the number of executions per unit time of the one distinctive action in the second environment coincide with each other within the predetermined tolerance. The estimation part 124 designates the distinctive action about which the coincidence within the predetermined tolerance is determined in the determination as a like distinctive action.

(7) In the first embodiment and the above modifications (1) to (6), the description is made about an example in which a second characteristic that is a characteristic of the target user in the second environment where an other user is present. However, in a case that the other user is a user who is a family member of the target user, the target user is likely to show the same characteristic as when being alone. In contrast, in a case that the other user is a user who is not a family member of the target user, the user is inferred to show a characteristic of paying more regard to the other user. As described above, the characteristic of the target user in the second environment is inferred to be not a little different according to the attribute of the other user who is in the second environment.

Therefore, the estimation part 124 may estimate the characteristic (third characteristic) of the target user when being in the respective second environments (hereinafter, third environment) where other users, different from the target user, of the respective one or more attributes are present on the basis of operations to the device 3 or equipment 5, or behaviors of the target user in the respective third environment. Further, the output part 125 may output information indicative of the characteristic of the target user in the respective third environment.

For example, the characteristic of the target user who is in the third environment where an other user of an attribute "A" is present may be estimated on the basis of the operation to the device 3 or equipment 5, or the behavior of the target user in the third environment, and information indicative of the characteristic may be output. Besides, the characteristic of the target user who is in the third environment where an other user of an attribute "B" is present may be estimated on the basis of the operation to the device 3 or equipment 5, or the behavior of the target user in the third environment, and information indicative of the characteristic may be output.

This processing may be implemented, for example, in the following manner.

In Step S205, the estimation part 124 further acquires pieces of third operation history information respectively associated with the one or more attributes of the other users from the second operation history information.

Specifically, the estimation part 124 acquires attribute information included in user information of users other than the target user stored in the user information storage part 132, and extracts, for example, one or more attributes overlapping in a predetermined number of other users or more.

The estimation part 124 executes the following processing in accordance with each of the one or more attributes. The estimation part 124 refers to the user information stored in the user information storage part 132 and the reference data and extracts sensor information including detection information indicative of information concerning the space 40 where an other user of each of the attributes is present from the second behavior history information. The estimation part 124 acquires the sensor information as information (hereinafter, third behavior history information associated with each of the attributes) indicative of the behavior of the target user in each of the second environments where the other users of the respective attributes are present.

Further, the estimation part 124 extracts operation information including an operation date and time coinciding with a detection date and time included in the third behavior history information associated with each of the attributes and including a device ID of a device 3 or equipment 5 provided in a space 40 provided with a sensor 7 whose sensor ID is included in the third behavior history information from the second operation history information with reference to the device information stored in the device information storage part 131. The estimation part 124 acquires the operation information as information (hereinafter, third operation history information associated with each of the attributes) indicative of an operation to a device 3 or equipment 5 of the target user in each of the second environments where an other user of an attribute is present.

Further, the estimation part 124 estimates a candidate trait associated with a distinctive action which is included in the third operation history information and the third behavior history information associated with each of the attributes and which is executed one time or more as a constituent trait of a characteristic (hereinafter, a third characteristic associated with each of the attributes) of the target user who is in each of the third environment where an other user of an attribute is present. Additionally, the estimation part 124 calculates an intensity of each of constituent traits included in a third characteristic associated with each of the attributes and stores information indicative of the third characteristic associated with each of the attributes as characteristic information of the target user in the user information storage part 132 in the same manner as in Step S206 (FIG. 5) of the first embodiment.

In this case, the output part 125 outputs information indicative of the third characteristic associated with each of the attributes in the same manner as in Step S300 (FIG. 3).

Specifically, the output part 125 sends (outputs) the information indicative of the third characteristic associated with each of the attributes to a predetermined external device such as the output device 6 using the communication circuit 11.

(8) In the first embodiment and the above modifications (1) to (7), the description is made about an example in which the intensity of each of the constituent traits included in the first characteristic and the second characteristic is set. However, in Step S206 (FIG. 5), the estimation part 124 may omit the setting of the intensity of each constituent trait to thereby exclude the respective intensities of the constituent traits in the first characteristic information and the second characteristic information.

Second Embodiment

Hereinafter, a second embodiment of the present disclosure will be described. In the second embodiment, a service to be performed to each user is determined on the basis of characteristic information which is generated in the first embodiment or the modifications thereof and indicates a characteristic of each user according to an environment where each user is present, and the service is then performed.

Specifically, in the second embodiment, the processor 12 further functions as the determination part 126 and the performance part 127 (FIG. 2). In the case that the user is in the first environment, the determination part 126 determines a service to be performed to the user on the basis of the first characteristic information of the user. In the case that the user is in the second environment, the determination part 126 determines a service to be performed to the user on the basis of the second characteristic information of the user. The performance part 127 performs the service determined by the determination part 126.

Flow of Service Providing Process

Figure 13:
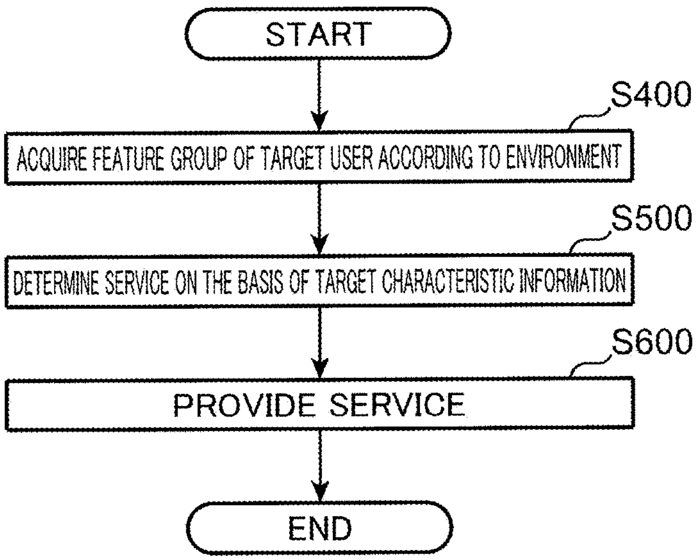
FIG. 13 is a flowchart showing an exemplary service providing process.

Hereinafter, a flow of a service providing process to be performed in an information processing device 1 of the second embodiment will be described. The service providing process executes a process of providing a service suitable to a characteristic of the user who is preliminarily registered as the target of the service providing process in the environment where the user is present. FIG. 13 is a flowchart showing an exemplary service providing process. The service performing process is executed every predetermined time. Every predetermined time means, for example, every hour, every half day, every day, every week, or every month. Hereinafter, the user who is the target of the service providing process is called as the target user in the same manner as in the first embodiment.

First, in Step S400, the determination part 126 acquires the characteristic information of the target user of the corresponding environment where the target user is currently present.

Specifically, the determination part 126 acquires the sensor information including the detection information concerning the space 40 where the target user is present from the sensor information storage part 134 with reference to the reference data including a user ID of the target user stored in the user information storage part 132. The determination part 126 acquires a piece of sensor information including the latest detection date and time among the acquired sensor information as information (hereinafter, current environment information) indicative of the behavior of the target user in the space 40 (hereinafter, fourth environment) where the target user is currently present. In other words, the current environment information is an example of the third information of the present disclosure.

The determination part 126 determines which of the first environment or the second environment the fourth environment is on the basis of the current environment information.

Specifically, the determination part 126 identifies one or more persons who are present in the fourth environment by collating detection information included in the current environment information with the reference data stored in the user information storage part 132.

In a case that the determination part 126 determines that the target user is alone in the fourth environment, the determination part 126 determines that the fourth environment is the first environment and acquires the first characteristic information of the target user from the user information storage part 132.

On the other hand, in a case that the determination part 126 determines that there is the target user and a user who cannot be identified using the reference data in the fourth environment, the determination part 126 determines that the fourth environment is the second environment and acquires the second characteristic information of the target user from the user information storage part 132.

Further, in a case that the determination part 126 determines that there is the target user and a user whose user ID is different from the target user in the fourth environment, the determination part 126 determines that the fourth environment is the second environment and acquires the second characteristic information of the target user from the user information storage part 132.

In the case that, as described in the modification (7), the third characteristic information associated with each of the attributes is stored in the user information storage part 132, the determination part 126 may check attribute information which is stored in the user information storage part 132 and is included in the user information of the user having a user ID different from the target user. Further, the determination part 126 may determine whether a piece of the third characteristic information associated with an attribute indicated by the attribute information is stored in the user information storage part 132. In a case that the determination part 126 determines that the piece of the third characteristic information is stored, the determination part 126 may determine that the fourth environment is the third environment where an other user of the relevant attribute is present, and acquire the third characteristic information from the user information storage part 132.

Hereinafter, the first characteristic information, the second characteristic information, and the third characteristic information which are acquired by the determination part 126 in Step S400 are collectively called as target characteristic information. Further, the characteristic of the target user that is indicated by the target characteristic information is called as a target characteristic.

Next, in Step S500, the determination part 126 determines a service to be performed to the target user on the basis of the target characteristic information acquired in Step S400.

Specifically, in Step S500, the determination part 126 acquires second rule information defining a relationship between one or more constituent trait groups each showing one or more constituent traits and one or more providing services from the rule information storage part 135.

FIG. 14 is a table showing exemplary second rule information. In the second rule information shown in FIG. 14, three constituent trait groups each showing two constituent traits are associated with providing services to be performed to users having target characteristics including constituent trait groups. For example, in the second rule information shown in FIG. 14, a constituent trait group showing two constituent traits which are the constituent trait "thrifty" and the constituent trait "well-regulated" is associated with a providing service "prediction of expendable part expenditure period". The providing service "prediction of expendable part expenditure period" is a service of predicting an expenditure period (end of life) of an expendable part adopted in the device 3 or equipment 5 which is used in the past by the target user and outputting information indicative of a result of the prediction.

In the second rule information, the number of constituent traits included in a constituent trait group associated with a providing service is not limited to two but may be one, or three or more.

In a case that the target characteristic includes one or more constituent trait groups included in the second rule information, the determination part 126 specifies one or more providing services associated with the one or more constituent trait groups, and determines the specified one or more providing services to be the service to be performed to the target user.

For example, in a case that the target characteristic includes three constituent traits "thrifty", "well-regulated", and "tidy", the determination part 126 determines the providing service "prediction of expendable part expenditure period" associated with the constituent trait group showing two constituent traits "thrifty" and "well-regulated" in the second rule information shown in FIG. 14 to be the service to be performed to the target user.

Further, the determination part 126 determines a providing service "suggestion of life tips" associated with a constituent trait group showing two constituent traits "thrifty" and "tidy" in the second rule information shown in FIG. 14 to be the service to be performed to the target user. The providing service "suggestion of life tips" is a service of outputting information concerning a space 40 where the target user is present more frequently than a predetermined frequency.

The way of determining the service in Step S500 is not limited thereto for example, the determination part 126 may determine a service to be performed to the target user on the basis of intensities of the respective constituent traits included in the target characteristic information as described below.

Specifically, in Step S500, the determination part 126 specifies one or more providing services (first providing service, second providing service) associated with one or more constituent trait groups included in the target characteristic in the second rule information in the same manner as the above. The determination part 126 designates the specified one or more providing services as a service candidate (hereinafter, service candidate) to be performed to the target user.

The determination part 126 acquires third rule information that associates the one or more providing services, coefficients given to the respective providing services, and service fields to which the respective providing services pertain with one another from the rule information storage part 135.

FIG. 15 is a table showing exemplary third rule information. FIG. 16 is a table showing a remaining part of the exemplary third rule information. In the third rule information shown in FIG. 15, thirteen providing services, coefficients given to the respective providing services, and service fields to which the respective providing services pertain are associated with one another, and further, types of the providing services are associated therewith.

For example, in the third rule information shown in FIG. 15, the type "notification" of the providing service, the providing service "notification of a to-do list", and a coefficient "0.1" given to the providing service, and the service field "life (general)" to which the providing service pertains are associated with one another. The providing service "notification of a to-do list" is a service of outputting a to-do list of the target user stored in the user information storage part 132.

In the third rule information shown in FIG. 16, five providing services, coefficients given to the providing services, and the service fields to which the respective providing services pertain are associated with one another, and further, the types of the providing services are associated therewith.

For example, in the third rule information shown in FIG. 16, the type "outsourcing" of the providing service, the providing service "food delivery (meal, food)", a coefficient "0.1" given to the providing service, and a service field "life (diet)" to which the providing service pertains are associated with one another. The providing service "food delivery (meal, food)" is a service of outputting information that guides the access to a website for the use of a food delivery service used by the target user in the past.

The determination part 126 calculates a product (first product, second product) for each of the one or more providing services included in the service candidates with reference to the third rule information by multiplying a sum of intensities of the one or more constituent traits included in the target characteristic and included in the one or more constituent trait groups associated with the one or more providing services included in the service candidates by a coefficient given to each of the one or more providing services.

For example, similarly to the above specific example, the target characteristic includes three constituent traits "thrifty", "well-regulated", and "tidy", and the respective intensities of the constituent traits are "0.2", "0.3", and "0.5", and the determination part 126 thus designates the two providing services "prediction of expendable part expenditure period" and "suggestion of life tips" as the service candidates with reference to the second rule information.

In this case, the determination part 126 calculates a product "0.05 (=0.1×0.5)" for the providing service "prediction of expendable part expenditure period" included in the service candidate by multiplying a sum "0.5 (=0.2+0.3)" of the respective intensities of the two constituent traits "thrifty" and "well-regulated" included in the target characteristic and included in the constituent trait group associated with the providing service "prediction of expendable part expenditure period" by the coefficient "0.1" given to the providing service "prediction of expendable part expenditure period".

Besides, the determination part 126 calculates a product "0.07 (=0.1×0.7)" for the providing service "suggestion of life tips" included in the service candidate by multiplying a sum "0.7 (=0.2+0.5)" of the respective intensities of the two constituent traits "thrifty" and "tidy" included in the target characteristic and included in the constituent trait group associated with the providing service "suggestion of life tips" by the coefficient "0.1" given to the providing service "suggestion of life tips".

In a case that a sum of the one or more products calculated for at least one providing services which are included in the service candidates and pertain to the one or more service fields is equal to or greater than a first predetermined value with reference to the third rule information, the determination part 126 determines the at least one providing services as the service to be performed to the target user.

For example, the service candidates include three providing services "alert notification of device or equipment", "prediction of expendable part expenditure period", and "suggestion of life tips", and the products calculated for the respective providing services are "0.03", "0.05", and "0.07".

In a case that a sum of the at least one products calculated for the at least one providing services which pertain to each of the one or more service fields and are included in the service candidates, i.e., for the three providing services "alert notification of device or equipment", "prediction of expendable part expenditure period", and "suggestion of life tips" pertaining to two service fields "devices and equipment" and "life (housework)" is equal to or greater than the first predetermined value, the determination part 126 determines the at least one providing services as the service to be performed to the target user.

Specifically, in the case that, in connection with the service field "devices and equipment", the sum "0.08 (=0.03+0.05)" of the two products "0.03" and "0.05" calculated for the two providing services "alert notification of device or equipment" and "prediction of expendable part expenditure period" pertaining to the service field "devices and equipment" and included in the service candidates is equal to or greater than the first predetermined value, the determination part 126 determines the two providing services "alert notification of device or equipment" and "prediction of expendable part expenditure period" as the services to be performed to the target user.

Besides, in the case that, in connection with the service field "life (housework)", the sum "0.07" of one product "0.07" calculated for one providing service "suggestion of life tips" pertaining to the service field "life (housework)" and included in the service candidates is equal to or greater than the first predetermined value, the determination part 126 determines the one providing service "suggestion of life tips" as the service to be performed to the target user.

Next, in Step S600, the performance part 127 performs the one or more providing services determined as the services to be performed to the target user in Step S500.

Specifically, in Step S600, the performance part 127 acquires fourth rule information that associates one or more providing services, a performance time of each of the providing services, and a performance way of each of the providing services with one another from the rule information storage part 135.

The performance time of the providing service includes, for example, a start time (e.g., at 12 o'clock, immediately) of the providing service, a time interval (e.g., every hour) at which the providing service is repeated, and the number of repetitions (e.g., three) of the providing service.

The performance way of the providing service includes, for example, an output destination and an output instruction of information (hereinafter, output information of the providing service) to be output through the performance of the providing service. The output information of the providing service includes, for example, information peculiar to the target user, e.g., to-do list, a schedule, and vital data of the user, control information of the device 3 or equipment 5, information which requests the performance of the service provided by the service server 8.

The output destination of the output information of the providing service includes, for example, an output device 6 used by the target user, the service server 8, the device 3 or equipment 5 indicated by the output information of the providing service. The output instruction of the output information of the providing service includes, for example, an instruction to display output information of the providing service, instruction to output audio, instruction to store, an instruction to forward, and an instruction to execute.

The performance part 127 executes a performance program of each of the providing services stored in the memory 13 at a performance time of each of the providing services determined in Step S500 with reference to the fourth rule information. The performance part 127 outputs output information of each of the providing services to an output destination determined by the performance way of each of the providing services together with an output instruction determined by the performance way of each of the providing services with reference to the fourth rule information. Accordingly, the output information of each of the providing services is output to the output destination in accordance with the output instruction.

The configuration of the second embodiment may adopt the following modifications.

(1) In the configuration of the second embodiment, in a case that a plurality of users registered in advance as a target of the service providing process is present in the same space 40, the service providing process is performed for each of the users as the target user.

This involves a case that the providing services (second services) to be performed to the target users, which are determined by the determination part 126 on the basis of the respective second characteristic information of the target users, include a plurality of providing services "automatic control of device or equipment". The providing service "automatic control of device or equipment" is a service of performing automatic control of a device 3 or equipment 5 provided in the space 40 where the user is present according to a characteristic of the user. In this case, when the providing services "automatic control of device or equipment" are performed by the performance part 127, the details of the automatic control of the device 3 or equipment 5 are liable to be in conflict with each other.

For example, in a case that the User A and the User B are in the same space 40, the service providing processes are respectively performed for the two users as the target user. Further, the determination part 126 determines the providing service "automatic control of device or equipment" as the service to be performed to the User A on the basis of the constituent trait "sensitive to heat" included in the second characteristic of the User A. Similarly, the determination part 126 determines the providing service "automatic control of device or equipment" as the service to be performed to the User B on the basis of the constituent trait "sensitive to cold" included in the second characteristic of the User B.

In this case, in the configuration of the second embodiment, the performance part 127 performs the providing service "automatic control of device or equipment" to be performed to the User A to thereby output control information of establishing the set temperature of an air conditioner in the space 40 where the User A is present to 25 degrees according to the constituent trait "sensitive to heat" of the User A. Further, the performance part 127 performs the providing service "automatic control of device or equipment" to be performed to the User B to thereby output control information of establishing the set temperature of the air conditioner in the space 40 where the User B is present to 27 degrees according to the constituent trait "sensitive to cold" of the User B. As a result, the set temperatures which are parameters used for automatic control of the air conditioner in the space 40 where the User A and the User B are present are in conflict with each other.

Therefore, in the above-described case that the providing services determined by the determination part 126 include the providing services "automatic control of device or equipment", the performance part 127 may calculate an average of the parameters used for automatic control of the device 3 or equipment 5 by the providing services "automatic control of device or equipment" to perform the service.

For example, in the case described above, the performance part 127 may calculate an average of the set temperatures which are the parameters used for automatic control of the air conditioner by the providing services "automatic control of device or equipment" to be performed to the User A and the User B, that is 26 degrees (=25 degrees+27 degrees/2), to thereby perform the providing service.

(2) In the case such as the modification (1) of the second embodiment where the providing services determined by the determination part 126 include the providing services "automatic control of device or equipment", it may be appreciated that the performance part 127 acquires a priority level predefined for each of the users to which the services "automatic control of device or equipment" are provided.

Specifically, the user information storage part 132 may store priority levels predefined for the respective users of the information processing system 100. For example, the higher priority level may be predetermined as the more unacceptable the one or more constituent traits (e.g., negligent, spendthrift) included in the second characteristic of the user are for a user whose one or more constituent traits (e.g., not negligent, not spendthrift) are different from the relevant one or more constituent traits. However, the way of predetermining the priority levels to the users is not limited thereto. The performance part 127 may acquire priority levels predefined for the respective users to which the providing services "automatic control of device or equipment" are provided from the user information storage part 132.

In this case, the performance part 127 may perform one of the providing services "automatic control of device or equipment" that is determined to be the service to be performed to one of the users who has the highest priority level.

(3) In the case such as the modification (1) of the second embodiment that the providing services determined by the determination part 126 include the providing services "automatic control of device or equipment", it may be appreciated that the performance part 127 performs one of the providing services "automatic control of device or equipment" that with the highest number of overlaps.

For example, the determination part 126 determines the providing service "automatic control of device or equipment" as the service to be performed to the User A on the basis of the constituent trait "sensitive to heat" included in the second characteristic of the User A and determines the providing service "automatic control of device or equipment" as the service to be performed to the User B on the basis of the constituent trait "sensitive to cold" included in the second characteristic of the User B. Additionally, the determination part 126 determines the providing service "automatic control of device or equipment" as the service to be performed to a User C who is in the same environment as the User A and the User B on the basis of the constituent trait "sensitive to heat" included in the second characteristic of the User C.

In this case, the performance part 127 may perform the service of outputting to the air conditioner the control information which establishes the set temperature of the air conditioner in the space 40 where the users are present as 25 degrees on the basis of the providing service "automatic control of device or equipment" with the highest number of overlaps among the three providing services "automatic control of device or equipment", i.e., according to the constituent trait "sensitive to heat".

(4) A priority order may be associated with each of the one or more constituent trait groups included in the second rule information (FIG. 14). For example, the associated priority order may be lower as the more unacceptable the one or more constituent traits (e.g., negligent, spendthrift) included in the constituent trait group are for a user whose one or more constituent traits (e.g., not negligent, not spendthrift) are included in a constituent trait group different from the relevant constituent trait group.

In the case such as the modification (1) of the second embodiment that the providing services determined by the determination part 126 include the providing services "automatic control of device or equipment", the performance part 127 may acquire priority orders associated with the respective one or more constituent trait groups included in the second rule information (FIG. 14).

Further, the performance part 127 may perform the providing service "automatic control of device or equipment" associated with the constituent trait group having the lowest priority order among the providing services "automatic control of device or equipment" determined by the determination part 126.

For example, in the second rule information of the modification, the constituent trait group including two constituent traits "negligent" and "spendthrift" is associated with the providing service "automatic control of device or equipment" and the priority order "1", and the constituent trait group including two constituent traits "well-regulated" and "thrifty" is associated with the providing service "automatic control of device or equipment" and the priority order "2".

Additionally, in the same manner as the modification (1) of the second embodiment, the providing services determined by the determination part 126 include the providing service "automatic control of device or equipment" associated with the constituent trait group including the two constituent traits "negligent" and "spendthrift" and the providing service "automatic control of device or equipment" associated with the constituent trait group including the two constituent traits "well-regulated" and "thrifty".

In this case, the performance part 127 may acquire priority orders respectively associated with the one or more constituent trait groups included in the second rule information. Further, the performance part 127 may perform the providing service "automatic control of device or equipment" associated with the constituent trait group including two constituent traits "negligent" and "spendthrift" having the lowest priority order "1" among the providing services "automatic control of device or equipment" determined by the determination part 126.

In this disclosure, the first embodiment, the modifications (1) to (8) of the first embodiment, the second embodiment, and the modifications (1) to (4) of the second embodiment may be optionally combined with one another.

The present disclosure is useful in providing a service suitable to the characteristic of a user in each of the cases where an other user is present and is absent in the same environment where the user is present.

The invention claimed is:

1. An information processing method for estimating a characteristic of a user, by a computer, the information processing method comprising:

acquiring first information indicative of a device operation and a behavior of a target user to be estimated;

acquiring second information indicative of presence or absence of an other user different from the target user in an environment where the target user is present;

extracting, based on the first information and the second information, first action information indicative of at least one of a first device operation or a first behavior of the target user in a first environment where the other user is absent and second action information indicative of at least one of a second device operation or a second behavior of the target user in a second environment where the other user is present;

estimating a first characteristic of the target user in the first environment based on the first action information, and a second characteristic of the target user in the second environment based on the second action information; and outputting at least one of first characteristic information indicative of the first characteristic or second characteristic information indicative of the second characteristic for providing a service to the target user based on the at least one of the first characteristic information or the second characteristic information, wherein, in the estimating of the first characteristic and the second characteristic, first rule information defining relationships between one or more candidate traits and one or more feature groups indicative of features of device operations or behaviors of the target user is acquired, in a first case that the first device operation or the first behavior showing one or more first feature groups included in the one or more feature groups is included in the first action information, one or more first candidate traits associated with the one or more first feature groups are specified among the one or more candidate traits, and the specified one or more first candidate traits are estimated to be the first characteristic, and in a second case that the second device operation or the second behavior showing one or more second feature groups included in the one or more feature groups is included in the second action information, one or more second candidate traits associated with the one or more second feature groups are specified among the one or more candidate traits, and the specified one or more second candidate traits are estimated to be the second characteristic.

2. The information processing method according to claim 1, wherein the first characteristic includes one or more first constituent traits, the second characteristic includes one or more second constituent traits, and the information processing method further comprises:

calculating, based on the first action information, a first number of executions of a first distinctive action that is the first device operation or the first behavior showing a first feature group associated with each of the one or more first constituent traits, and setting the calculated first number of executions of the first distinctive action as a first intensity of each of the first constituent traits; and calculating, based on the second action information, a second number of executions of a second distinctive action that is the second device operation or the second behavior showing a second feature group associated with each of the one or more second constituent traits, and setting the calculated second number of executions of the second distinctive action as a second intensity of each of the second constituent traits, whereby the first characteristic information includes the first intensity of each of the first constituent traits, and the second characteristic information includes the second intensity of each of the second constituent traits.

3. The information processing method according to claim 2, wherein, in the setting of the first intensity of each of the first constituent traits and the setting of the second intensity of each of the second constituent traits, third action information indicative of a device operation and a behavior of one or more other users different from the target user is further acquired, a first average that is an average of first numbers of executions of the first distinctive action by each of the one or more other users per a predetermined time is calculated based on the third action information, a first execution number that is the first number of executions of the first distinctive action per the predetermined time is calculated based on the first action information, and a result obtained by dividing the first execution number by the first average is set as the first intensity of each of the first constituent traits, and a second average that is an average of second numbers of executions of the second distinctive action by each of the one or more other users per the predetermined time is calculated based on the third action information, a second execution number that is the second number of executions of the second distinctive action per the predetermined time is calculated based on the second action information, and a result obtained by dividing the second execution number by the second average is set as the second intensity of each of the second constituent traits.

4. The information processing method according to claim 2, wherein, in the estimating of the first characteristic and the second characteristic, in a third case that a common distinctive action that is a common device operation or a common behavior showing a feature group associated with a common candidate trait predetermined among the one or more candidate traits is included in at least one of the first action information or the second action information, the common candidate trait is estimated to be a common constituent trait included in the first characteristic and the second characteristic, in the setting of the first intensity of each of the first constituent traits and the setting of the second intensity of each of the second constituent traits, a first execution number that is a first common number of executions of the common distinctive action is calculated based on the first action information, a second execution number that is a second common number of executions of the common distinctive action is calculated based on the second action information, and a sum of the first execution number and the second execution number is set as an intensity of the common constituent trait.

5. The information processing method according to claim 2, wherein, in the estimating of the first characteristic and the second characteristic, in a third case that a common distinctive action that is a common device operation or a common behavior showing a feature group associated with a common candidate trait predetermined among the one or more candidate traits is included in at least one of the first action information or the second action information, the common candidate trait is estimated to be a common constituent trait included in the first characteristic and the second characteristic, in the setting of the first intensity of each of the first constituent traits and the setting of the second intensity of each of the second constituent traits, a first time for which the target user is in the first environment is calculated based on the first action information, and a second time for which the target user is in the second environment is calculated based on the second action information, a first execution number that is a first common number of executions of the common distinctive action is calculated based on the first action information, and a second execution number that is a second common number of executions of the common distinctive action is calculated based on the second action information, a first result obtained by dividing a first product of the first time and a first sum of the first execution number and the second execution number by a second sum of the first time and the second time is set as a first common intensity of the common constituent trait included in the first characteristic, and a second result obtained by dividing a second product of the second time and the first sum of the first execution number and the second execution number by the second sum of the first time and the second time is set as a second common intensity of the common constituent trait included in the second characteristic.

6. The information processing method according to claim 4, further comprising:

estimating, in a fourth case that an identical constituent trait indicates close intensities in the first characteristic and the second characteristic, the identical constituent trait to be the common constituent trait.

7. The information processing method according to claim 4, further comprising:

estimating, in a fourth case that a like distinctive action that is a like device operation or a like behavior which shows one of the one or more feature groups and of which respective numbers of executions per a unit time in the first environment and the second environment are close to each other is included in the first information, a candidate trait associated with the one feature group shown by the like distinctive action to be the common constituent trait.

8. The information processing method according to claim 2, further comprising:

reducing, in a third case that no device operation or behavior showing one feature group associated with one of the one or more first constituent traits is executed for a first predetermined time or longer, the first intensity of the one first constituent trait by a first reduction rate; and reducing, in a fourth case that no device operation or behavior showing one feature group associated with one of the one or more second constituent traits is executed for a second predetermined time or longer, the second intensity of the one second constituent trait by a second reduction rate.

9. The information processing method according to claim 2, further comprising:

calculating a first ratio of the first intensity of each of the one or more first constituent traits to a first sum of first intensities of the one or more first constituent traits to set the calculated first ratio as the first intensity of each of the first constituent traits; and calculating a second ratio of the second intensity of each of the one or more second constituent traits to a second sum of second intensities of the one or more second constituent traits to set the calculated second ratio as the second intensity of each of the second constituent traits.

10. The information processing method according to claim 8, further comprising:

calculating a first ratio of the first intensity of each of the one or more first constituent traits to a first sum of first intensities of the one or more first constituent traits to set the calculated first ratio as the first intensity of each of the first constituent traits; and calculating a second ratio of the second intensity of each of the one or more second constituent traits to a second sum of second intensities of the one or more second constituent traits to set the calculated second ratio as the second intensity of each of the second constituent traits.

11. The information processing method according to claim 1, further comprising:

excluding, in a third case that no device operation or behavior showing one feature group associated with one of the one or more first constituent traits is executed for a first predetermined time or longer, the one first constituent trait from the first characteristic; and excluding, in a fourth case that no device operation or behavior showing one feature group associated with one of the one or more second constituent traits is executed for a second predetermined time or longer, the one second constituent trait from the second characteristic.

12. The information processing method according to claim 1, further comprising:

acquiring information indicative of one or more attributes of the other user; and extracting, from the second action information, fourth action information indicative of a third device operation and a third behavior of the target user in a third environment in which the other user of each of the one or more attributes is present, and estimating, based on the fourth action information, a third characteristic of the target user in the third environment, and outputting third characteristic information concerning the third characteristic.

13. The information processing method according to claim 1, wherein, in the acquiring of the first information, third information indicative of a third device operation and a third behavior of the target user in a first predetermined period is acquired as the first information, and in the acquiring of the second information, fourth information indicative of a history concerning the presence or the absence of the other user in the environment where the target user is present in the first predetermined period is acquired as the second information.

14. The information processing method according to claim 1, further comprising:

acquiring third information indicative of a third behavior of the target user in a third environment where the target user is currently present;

determining, based on the third information, which of the first environment or the second environment is the third environment where the target user is currently present;

in a third case that the third environment is the first environment, acquiring the first characteristic information, determining a first service to be performed to the target user based on the first characteristic information, and performing the first service; and in a fourth case that the third environment is the second environment, acquiring the second characteristic information, determining a second service to be performed to the target user based on the second characteristic information, and performing the second service.

15. The information processing method according to claim 14, wherein the first characteristic includes one or more first constituent traits, the second characteristic includes one or more second constituent traits, in a determination of the first service and the second service, second rule information defining a relationship between one or more constituent trait groups each showing one or more constituent traits and one or more providing services is acquired, in a fifth case that the first characteristic includes one or more first constituent trait groups included in the one or more constituent trait groups, one or more first providing services associated with the one or more first constituent trait groups are specified, and the specified one or more first providing services are determined as the first service, and in a sixth case that the second characteristic includes one or more second constituent trait groups included in the one or more constituent trait groups, one or more second providing services associated with the one or more second constituent trait groups are specified, and the specified one or more second providing services are determined as the second service.

16. The information processing method according to claim 2, further comprising:

acquiring third information indicative of a third behavior of the target user in a third environment where the target user is currently present;

determining, based on the third information, which of the first environment or the second environment is the third environment where the target user is currently present;

in a third case that the third environment is the first environment, acquiring the first characteristic information, determining a first service to be performed to the target user based on the first characteristic information, and performing the first service; and in a fourth case that the third environment is the second environment, acquiring the second characteristic information, determining a second service to be performed to the target user based on the second characteristic information, and performing the second service.

17. The information processing method according to claim 16, wherein, in a determination of the first service or the second service, second rule information defining a relationship between one or more constituent trait groups each showing one or more constituent traits and one or more providing services is acquired, in a fifth case that the first characteristic includes one or more first constituent trait groups included in the one or more constituent trait groups, one or more first providing services associated with the one or more first constituent trait groups are specified, and in a sixth case that the second characteristic includes one or more second constituent trait groups included in the one or more constituent trait groups, one or more second providing services associated with the one or more second constituent trait groups are specified, third rule information that associates the one or more providing services, coefficients given to the respective providing services, and service fields to which the respective providing services pertain with one another is acquired, a first product for each of the one or more first providing services is calculated by multiplying a first sum of first intensities of one or more constituent traits included in the first characteristic and included in constituent trait groups associated with the respective first providing services by a first coefficient given to the respective first providing service, in a seventh case that a second sum of the first product calculated for at least one first providing service pertaining to each of one or more first service fields, to which the one or more first providing services belong, among the one or more service fields is equal to or greater than a first predetermined value, the at least one first providing service is determined as the first service, a second product for each of the one or more second providing services is calculated by multiplying a second sum of second intensities of one or more constituent traits included in the second characteristic and included in constituent trait groups associated with the respective second providing services by a second coefficient given to the respective second providing service, in an eighth case that a third sum of the second product calculated for at least one second providing service pertaining to each of one or more second service fields, to which the one or more second providing services belong, among the one or more service fields is equal to or greater than the first predetermined value, the at least one second providing service is determined as the second service.

18. The information processing method according to claim 14, wherein, in a fifth case that a plurality of users is present in a same environment, the second service is determined by treating each of the plurality of users as the target user, and in a sixth that the determined second service includes a plurality of services of performing automatic control of a device provided in the same environment where the plurality of users is present according to a characteristic of the plurality of users, parameters used for the automatic control of the device are averaged in performance of the second services.

19. The information processing method according to claim 14, wherein, in a fifth that a plurality of users is present in a same environment, the second service is determined by treating each of the plurality of users as the target user, and in a sixth that the determined second service includes a plurality of services of performing automatic control to a device provided in the same environment where the plurality of users is present according to a characteristic of the plurality of users, in performance of the plurality of services, a priority level predefined for each of the plurality of users is acquired, and a service that is among the plurality of services and is determined to be the second service to be offered to a user who has a highest priority level among the plurality of users is performed.

20. The information processing method according to claim 14, wherein, in a fifth that a plurality of users is present in a same environment, the second service is determined by treating each of the plurality of users as the target user, and in a sixth that the determined second service includes a plurality of services of performing automatic control to a device provided in the same environment where the plurality of users is present according to a characteristic of the plurality of users, one of the plurality of services with a highest number of overlaps among the plurality of services is performed in the performing of the second service.

21. The information processing method according to claim 15, wherein, in a seventh case that a plurality of users is present in a same environment, the second service is determined by treating each of the plurality of users as the target user, and in an eighth case that a plurality of the specified one or more second services includes a plurality of services of performing automatic control to a device provided in the same environment where the plurality of users is present according to a characteristic of the plurality of users, a priority order predetermined for each of the one or more constituent trait groups is acquired, and in performance of the plurality of services, a service associated with a lowest constituent trait group in the priority order among the plurality of services is performed.

22. An information processing device for estimating a characteristic of a user, the information processing device comprising:

a processor; and a memory including a program that, when executed by the processor, causes the processor to function as:

a first acquisition part that acquires first information indicative of a device operation and a behavior of a target user to be estimated;

a second acquisition part that acquires second information indicative of presence or absence of an other user different from the target user in an environment where the target user is present;

an extraction part that extracts, based on the first information and the second information, first action information indicative of at least one of a first device operation or a first behavior of the target user in a first environment where the other user is absent and second action information indicative of at least one of a second device operation or a second behavior of the target user in a second environment where the other user is present;

an estimation part that estimates a first characteristic of the target user in the first environment based on the first action information, and a second characteristic of the target user in the second environment based on the second action information; and an output part that outputs at least one of first characteristic information indicative of the first characteristic or second characteristic information indicative of the second characteristic for providing a service to the target user based on the at least one of the first characteristic information or the second characteristic information, wherein, in estimating the first characteristic and the second characteristic, the estimation part:

acquires first rule information defining relationships between one or more candidate traits and one or more feature groups indicative of features of device operations or behaviors of the target user, in a first case that the first device operation or the first behavior showing one or more first feature groups included in the one or more feature groups is included in the first action information, specifies one or more first candidate traits associated with the one or more first feature groups among the one or more candidate traits, with the specified one or more first candidate traits being estimated to be the first characteristic, and in a second case that the second device operation or the second behavior showing one or more second feature groups included in the one or more feature groups is included in the second action information, specifies one or more second candidate traits associated with the one or more second feature groups among the one or more candidate traits, with the specified one or more second candidate traits being estimated to be the second characteristic.

23. A non-transitory computer readable storage medium storing a program causing a computer to estimate a characteristic of a user, the program causing the computer to function as:

a first acquisition part that acquires first information indicative of a device operation and a behavior of a target user to be estimated;

a second acquisition part that acquires second information indicative of presence or absence of an other user different from the target user in an environment where the target user is present;

an extraction part that extracts, based on the first information and the second information, first action information indicative of at least one of a first device operation or a first behavior of the target user in a first environment where the other user is absent and second action information indicative of at least one of a second device operation or a second behavior of the target user in a second environment where the other user is present;

an estimation part that estimates a first characteristic of the target user in the first environment based on the first action information, and a second characteristic of the target user in the second environment based on the second action information; and an output part that outputs at least one of first characteristic information indicative of the first characteristic or second characteristic information indicative of the second characteristic for providing a service to the target user based on the at least one of the first characteristic information or the second characteristic information, wherein, in estimating the first characteristic and the second characteristic, the estimation part:

acquires first rule information defining relationships between one or more candidate traits and one or more feature groups indicative of features of device operations or behaviors of the target user, in a first case that the first device operation or the first behavior showing one or more first feature groups included in the one or more feature groups is included in the first action information, specifies one or more first candidate traits associated with the one or more first feature groups among the one or more candidate traits, with the specified one or more first candidate traits being estimated to be the first characteristic, and in a second case that the second device operation or the second behavior showing one or more second feature groups included in the one or more feature groups is included in the second action information, specifies one or more second candidate traits associated with the one or more second feature groups among the one or more candidate traits, with the specified one or more second candidate traits being estimated to be the second characteristic.

* * * * *